(12) United States Patent
Ueno et al.

(10) Patent No.: US 8,239,100 B2
(45) Date of Patent: Aug. 7, 2012

(54) ELECTRIC BRAKING APPARATUS AND VEHICLE HAVING THEREOF

(75) Inventors: Kentarou Ueno, Hitachinaka (JP); Mitsuhide Sasaki, Isehara (JP); Hirotaka Oikawa, Yokohama (JP); Tohma Yamaguchi, Kawaskai (JP); Hiroki Takeda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 626 days.

(21) Appl. No.: 11/835,786

(22) Filed: Aug. 8, 2007

(65) Prior Publication Data

US 2008/0059023 A1 Mar. 6, 2008

(30) Foreign Application Priority Data

Aug. 31, 2006 (JP) .................................. 2006-234863

(51) Int. Cl.
*B60R 22/00* (2006.01)
*E05F 15/00* (2006.01)
*G05D 1/00* (2006.01)
*G05D 3/00* (2006.01)
*G06F 7/00* (2006.01)
*G06F 17/00* (2006.01)

(52) U.S. Cl. ............... 701/45; 701/36; 701/49; 701/70; 303/124; 303/20; 188/24.14; 188/71.1; 188/72.1; 188/72.3

(58) Field of Classification Search ............... 303/124, 303/3, 15, 16, 17, 115.2, 20; 477/182; 192/12 R; 701/36, 45, 49, 70, 78, 83; 188/24.14, 24.19, 188/24.16, 71.1, 71.3, 71.6, 71.7, 72.1, 72.3, 188/73.1, 73.31, 362, 369, 206 R
See application file for complete search history.

(56) References Cited

U.S. PATENT DOCUMENTS

| | | | | |
|---|---|---|---|---|
| 5,957,246 A * | 9/1999 | Suzuki | | 188/72.1 |
| 6,193,021 B1 * | 2/2001 | Dieckmann et al. | | 188/1.11 E |
| 6,253,141 B1 * | 6/2001 | McCann | | 701/71 |
| 6,464,308 B2 * | 10/2002 | Kubota | | 303/20 |
| 6,679,355 B2 * | 1/2004 | Suzuki | | 188/71.9 |
| 6,748,310 B2 * | 6/2004 | Tamasho et al. | | 701/70 |
| 2005/0035653 A1 * | 2/2005 | Godlewsky et al. | | 303/122.03 |
| 2005/0194836 A1 * | 9/2005 | Simpson et al. | | 303/20 |
| 2006/0021831 A1 * | 2/2006 | Yamamoto | | 188/72.7 |

(Continued)

FOREIGN PATENT DOCUMENTS

| | | |
|---|---|---|
| FR | 2851537 A1 | 8/2004 |
| JP | 2000-55094 A | 2/2000 |
| JP | 2001-225741 A | 8/2001 |

OTHER PUBLICATIONS

Japanese Office Action dated Aug. 19, 2008 (two (2) pages).
European Search Report mailed Mar. 31, 2010.

*Primary Examiner* — Thomas Tarcza
*Assistant Examiner* — Rami Khatib
(74) *Attorney, Agent, or Firm* — Crowell & Moring LLP

(57) ABSTRACT

An electric braking apparatus which first moves a piston in a detaching direction or passes a current to move the piston in the detaching direction in order to detect a pad contacting position. Furthermore, while the piston moves in the detaching direction, pad non-contact judgment is performed. After a pad non-contact state is confirmed, the piston is moved in a pressing direction to detect the pad contacting position. When the piston does not move in the detaching direction, it is judged that a parking brake has an ON-state, and it is waited until a host system instructs parking brake release.

24 Claims, 23 Drawing Sheets

U.S. PATENT DOCUMENTS

2006/0090968 A1* 5/2006 Taylor et al. .............. 188/1.11 L
2007/0052289 A1* 3/2007 Nilsson et al. .................. 303/20
2007/0074937 A1* 4/2007 Longuemare et al. ........ 188/156
2008/0029355 A1* 2/2008 Kawahara et al. ........... 188/72.1

* cited by examiner

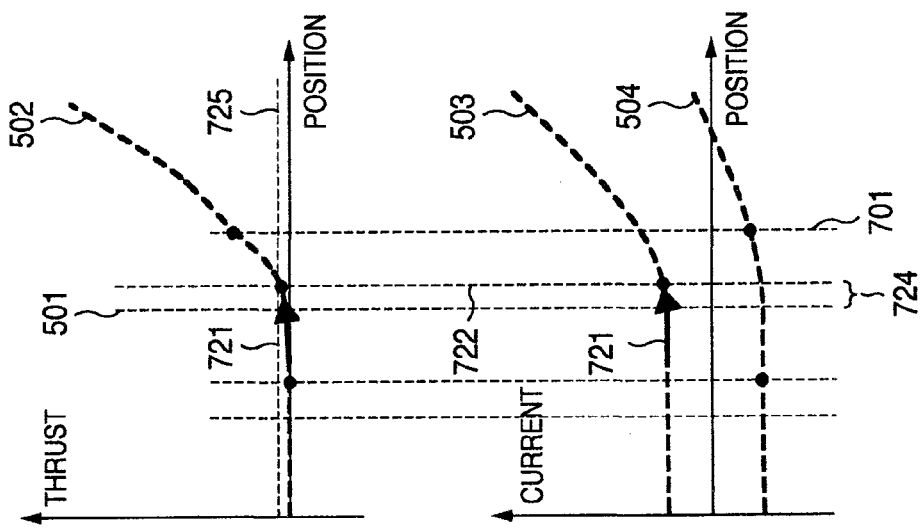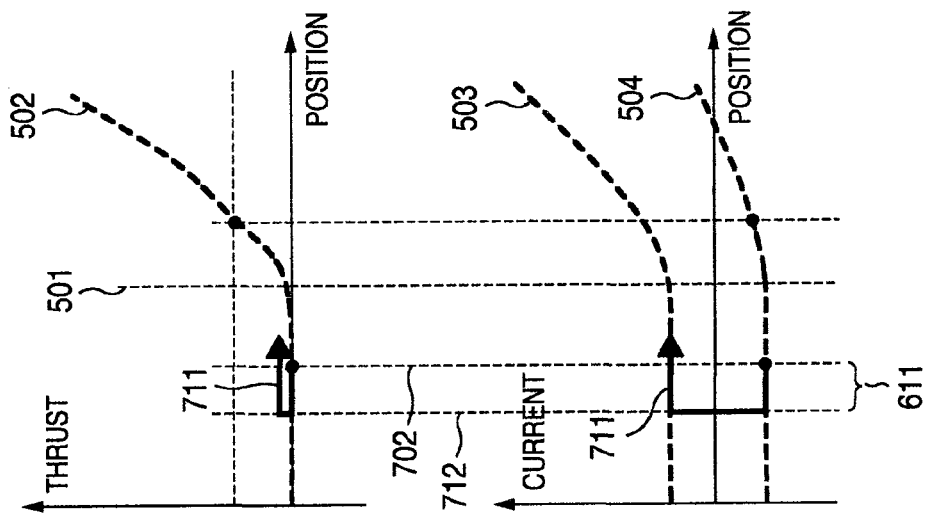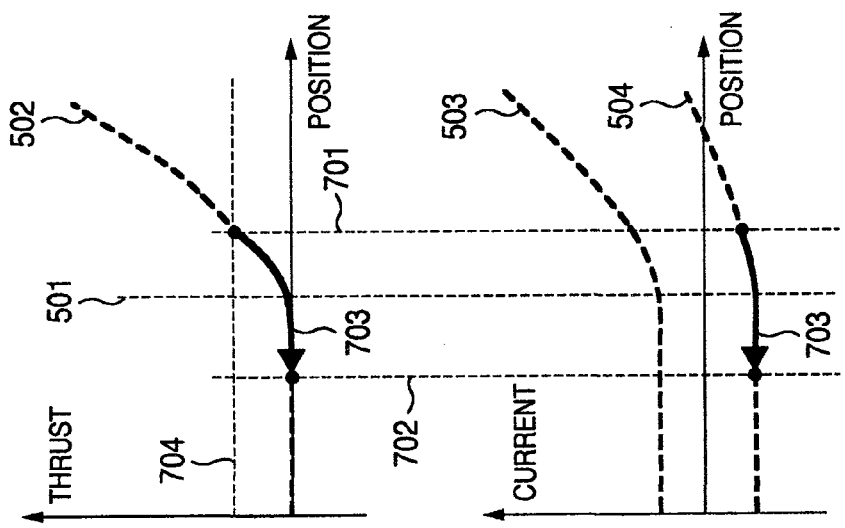

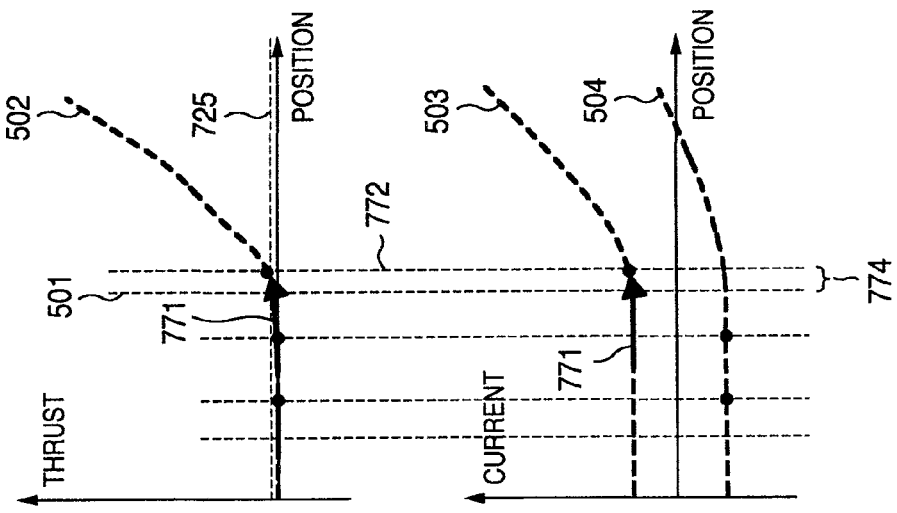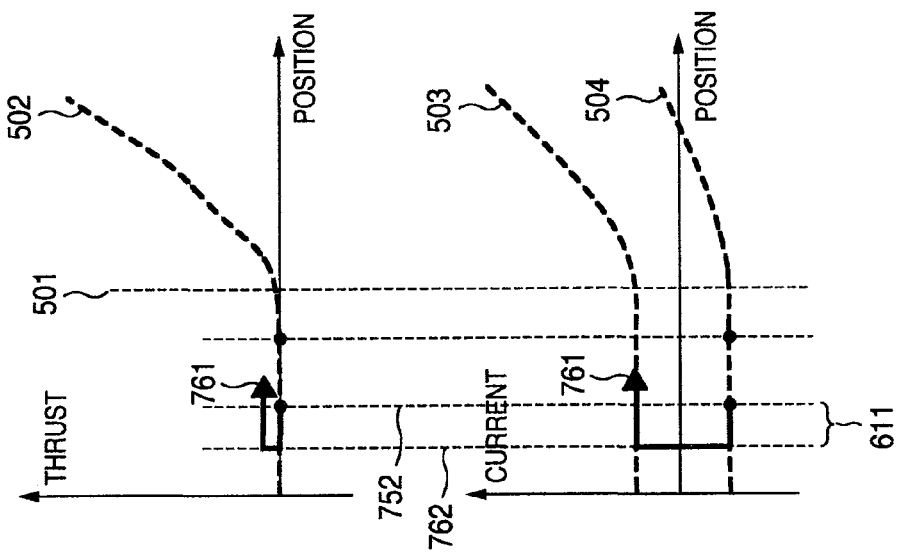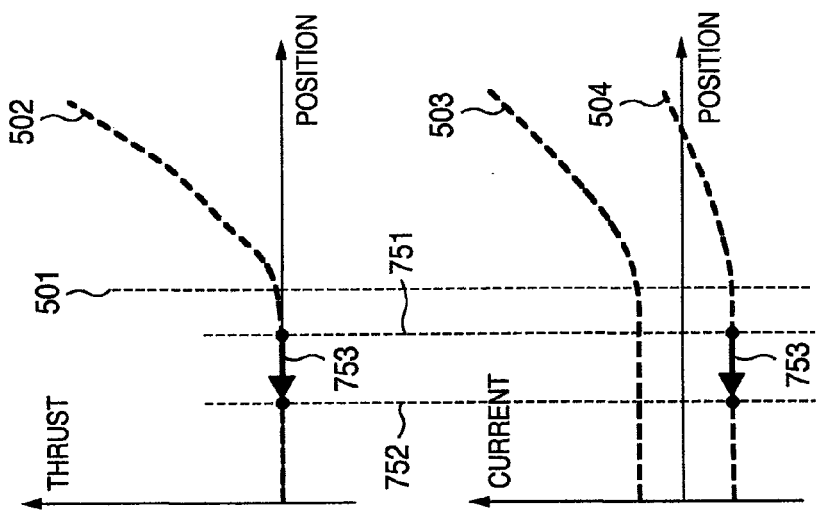

ELECTRIC BRAKING APPARATUS AND VEHICLE HAVING THEREOF

CROSS-REFERENCE TO RELATED APPLICATION

The present application relates to subject matters described in a co-pending patent application Ser. No. 11/835,770 to be filed on Aug. 8, 2007 entitled "ELECTRIC BRAKING APPARATUS AND METHOD OF CONTROLLING THEREOF" by Yasufumi Konishi, et al. and assigned to the assignees of the present application. The disclosures of this co-pending application are incorporated herein by reference.

BACKGROUND OF THE INVENTION

The present invention relates to an electric braking apparatus which generates a braking force in a vehicle by a motor, and a vehicle on which the apparatus is mounted.

Heretofore, braking of a vehicle has been realized by multiplying a depressing force exerted on a pedal by a driver and transmitting the force to a hydraulic caliper of wheels by a hydraulic system. However, in recent years, owing to development of an electronic technology, a "by-wire" system is developed in which an amount of the pedal to be depressed is acquired by a sensor and an electric caliper electrically generates a braking force based on the amount.

In the by-wire system, hydraulic piping lines are abolished, and the braking force to be applied to the vehicle can freely be controlled in response to an electric signal. The electric caliper has therein a motor, and employs a constitution in which the motor is controlled to press a piston or a pad onto a rotor. The caliper sometimes has a parking brake (PKB) function of retaining a pressed state of the piston or the pad even in a non-energized state.

However, in order to correctly generate the braking force in the vehicle with the electric caliper constituted in this manner, it is indispensable to detect a pad contacting position in a state in which the PKB function is released. In general, since the pad contacting position constantly changes with a worn state or a thermally expanded state of the pad, the electric caliper requires a unit which detects the pad contacting position. To meet this requirement, a method of judging the pad contacting position with a current at a time when the pad is brought into contact at a constant speed (e.g., see US Patent Application Publication No. US2002/0027387) and a method of calculating the pad contacting position from a piston advancing position at a time when the constant current is passed (e.g., see Japanese Patent Application Laid-Open No. JP-A-2000-55094) are known.

SUMMARY OF THE INVENTION

In a method of judging a pad contacting position with a current at a time when a pad is brought into contact at a constant speed, a clearance needs to be constantly secured apart from the pad contacting position. A response during generation of a thrust deteriorates. There is also a problem that, in a case where the pad thermally expands more than the clearance, the pad contacting position might not be detected. In a method of calculating the pad contacting position from a piston advancing position at a time when the constant current is passed, a certain degree of thrust for detection of the pad contacting position needs to be generated, and there is a problem that a vehicle behavior is influenced during the detection of the pad contacting position.

For a purpose of detection of a position where a brake pad comes in contact with a brake rotor, the brake pad is detached from the brake rotor at a predetermined timing, and the contacting position is detected based on a sensor signal at a time when the brake pad or piston moves away.

The pad contacting position can be detected without influencing any vehicle behavior.

Other objects, features and advantages of the invention will become apparent from the following description of the embodiments of the invention taken in conjunction with the accompanying drawings.

BRIEF DESCRIPTION OF THE DRAWINGS

FIGS. 20A, 20B, 20C, 20D, 20E and 20F are graphs showing one example of the pad contacting position detecting method;

FIGS. 21A, 21B, 21C, 21D, 21E and 21F are graphs showing one example of the pad contacting position detecting method;

DESCRIPTION OF THE EMBODIMENTS

A main constitution of an embodiment to which the present invention is applied will hereinafter be described with reference to the drawings.

Figure 1:
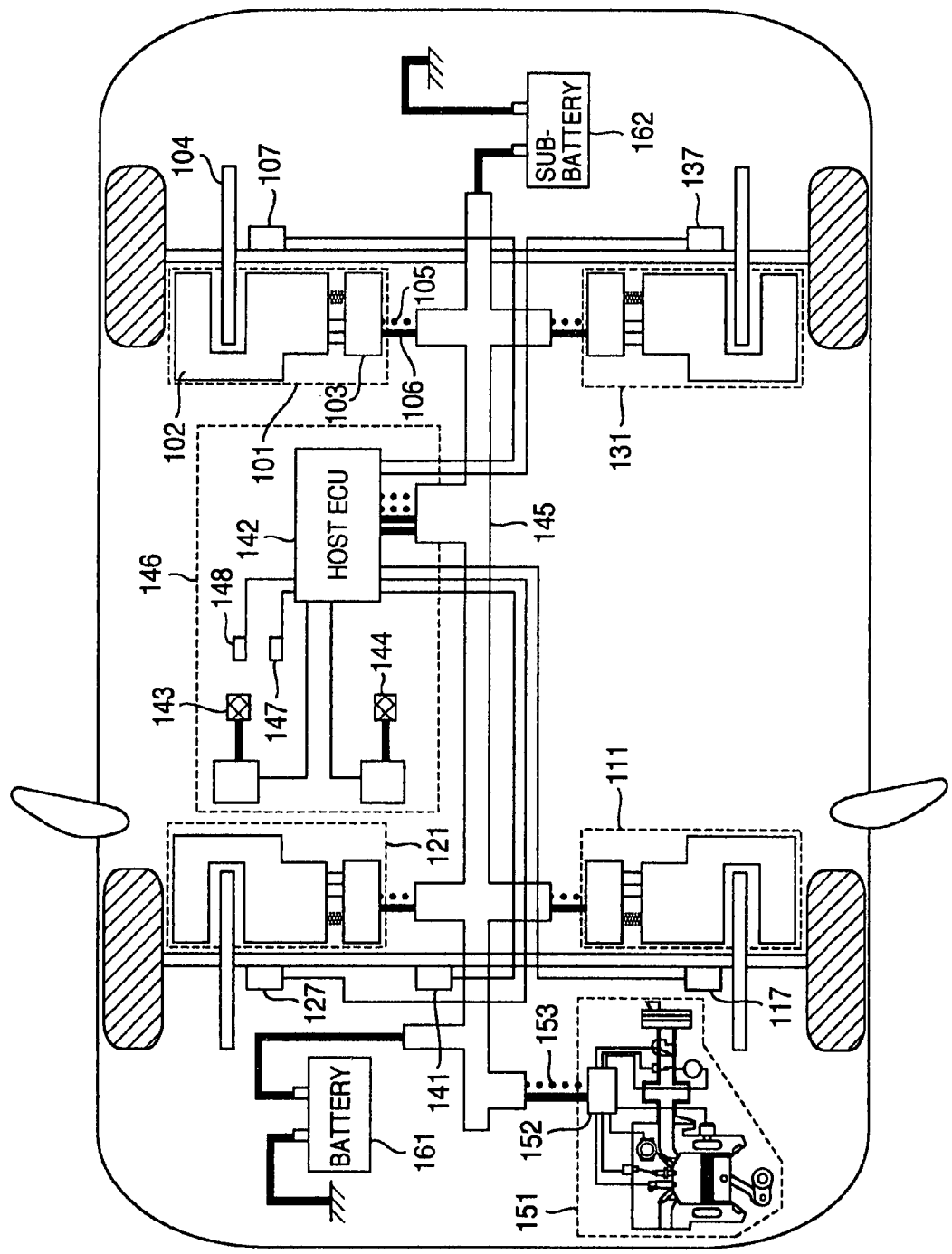
FIG. 1 shows a system constitution diagram of a vehicle according to one embodiment of the present invention.
Figure 2:
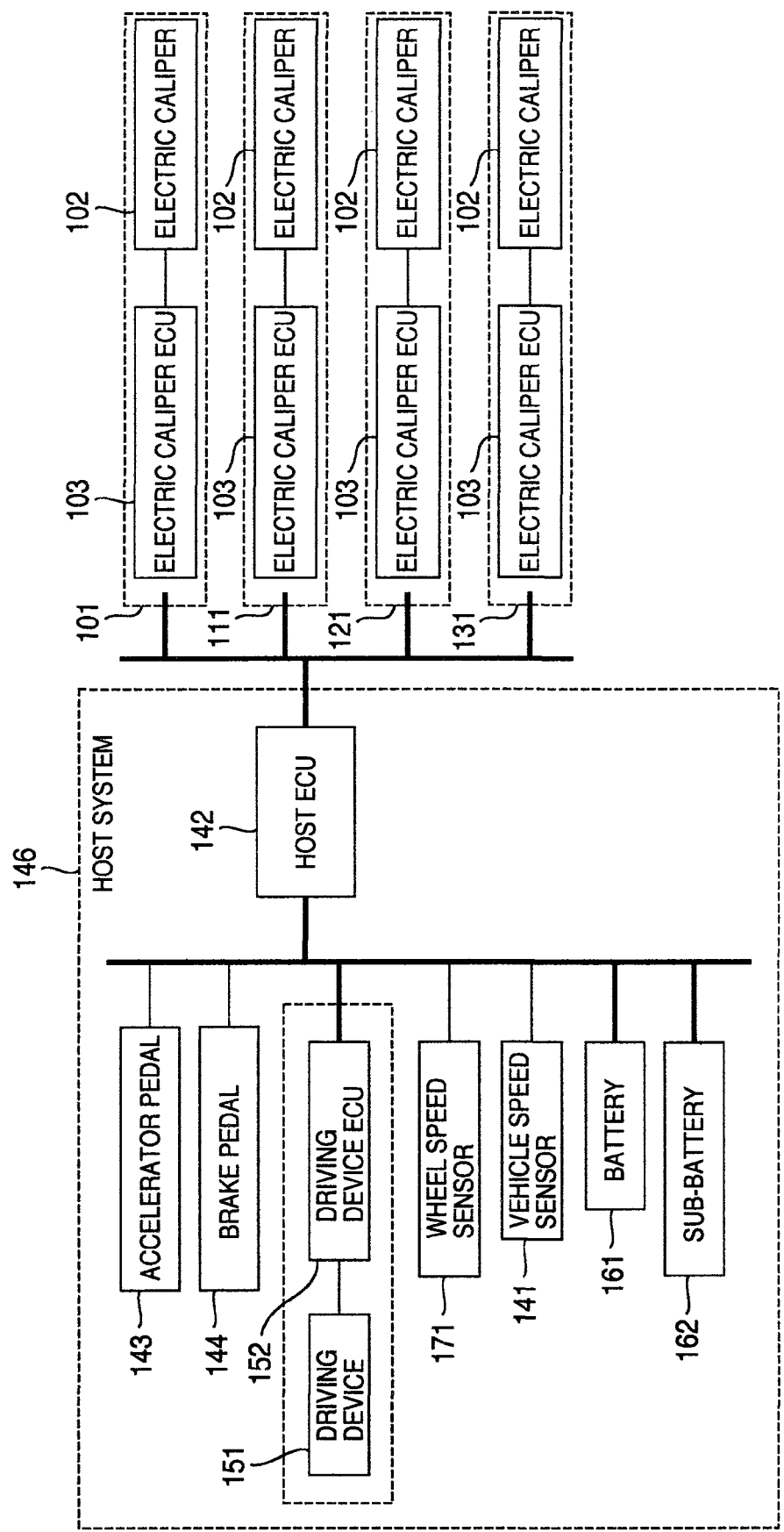
FIG. 2 shows a system block diagram of FIG. 1.

FIG. 1 shows a system constitution diagram of a vehicle according to one embodiment of the present invention. FIG. 2 shows a system block diagram of FIG. 1.

Reference numeral 101 is an electric braking apparatus which generates a braking force in the vehicle. The electric braking apparatus includes an electric caliper 102 and an electric caliper ECU 103. The electric caliper presses a piston onto a rotor 104 by an electric actuator or motor to generate the braking force in the vehicle. The electric caliper ECU 103 receives power supply from a power route 106 connected to a main battery 161 or a sub-battery 162, and controls a current and a voltage so as to drive the motor of the electric caliper 102. The electric caliper ECU 103 controls the electric caliper 102 based on information of the electric caliper 102 and an instruction transmitted from a host ECU 142 via a communication route 105. The electric caliper 102 and the electric caliper ECU 103 may be integrated or separated.

The electric braking apparatus is attached to each wheel of the vehicle, 101 is a right rear wheel, 111 is a left front wheel, 121 is a right front wheel, and 131 is a left rear wheel.

Moreover, for example, a wheel speed sensor 171 is attached to each wheel, and a rotation speed of each wheel may be recognized by the host ECU 142. Here, a wheel speed sensor 107 may transmit a wheel speed of the right rear wheel to the host ECU 142, a wheel speed sensor 117 may transmit a wheel speed of the left front wheel to the host ECU, a wheel speed sensor 127 may transmit a wheel speed of the right front wheel to the host ECU, and a wheel speed sensor 137 may transmit a wheel speed of the left rear wheel to the host ECU, respectively.

Furthermore, for example, the host ECU 142 may acquire information of a vehicle speed sensor 141 attached to the driving wheel.

Both or one of the wheel speed sensor 171 (i.e., the wheel speed sensors 107, 117, 127 and 137) and the vehicle speed sensor 141 may be attached. The host ECU 142 calculates a running speed of the vehicle or a vehicle speed based on information obtained from the wheel speed sensor 171 and/or the vehicle speed sensor 141.

Reference numeral 151 is a driving device of the vehicle. Moreover, 152 is a driving device ECU which controls the driving device. Here, for example, the driving device ECU 152 is connected to the host ECU 142 via a communication route 153, and the host ECU 142 may acquire a state of the driving device. The driving device 151 may include an engine and/or an electric motor. The host ECU 142 may acquire an engine rotation number, an engine torque or the like as the state of the driving device, or acquire or judge the presence of an engine brake as the state. As the state of the driving device, for example, the number of the rotations of the electric motor, an output torque thereof, a driving current or the like may be acquired. When a regenerative current flows, the current or a regenerative amount may be acquired. The presence of a regenerative brake may be acquired or judged as the state.

The host ECU 142 may acquire information of a brake pedal 144. Here, the information of the brake pedal 144 may be a stroke indicating a depth with which the pedal has been depressed from an origin or a depressing force indicating a strength with which the pedal has been depressed. The information may be switch information indicating whether or not the pedal has been depressed. The host ECU 142 may judge, based on the information of the brake pedal 144, whether or not the driver depresses the brake pedal, or recognize a driver's intention to brake the vehicle to transmit an instruction to brake the vehicle as desired by the driver to the electric braking apparatus.

Moreover, the host ECU 142 may acquire information of an accelerator pedal 143. Here, the information of the accelerator pedal 143 may be a stroke indicating a depth with which the pedal has been depressed from an origin, a depressing force indicating a strength with which the pedal has been depressed, switch information indicating whether or not the pedal has been depressed, or an accelerator opening indicating a degree of driving of the driving device 151 based on the amount of the pedal to be depressed.

Furthermore, the host ECU 142 may acquire information of a PKB SW 147. The host ECU 142 may judge whether to operate or release a PKB from the information of the brake pedal 144, the accelerator pedal 143 and the PKB SW 147 to give an instruction to the electric braking apparatus.

In addition, the host ECU 142 may turn on or off a PKB operation lamp 148 in accordance with the information transmitted from the PKB SW 147 and the electric braking apparatus via the communication route or information stored in the host ECU 142 itself.

Here, the accelerator pedal 143, the brake pedal 144, the PKB SW 147, the driving device 151, the wheel speed sensor 171, the vehicle speed sensor 141, the battery 161, the sub-battery 162, the host ECU 142, a system 145 and the like are included in a host system 146. The host system 146 is a host system seen from the electric braking apparatus, and may include another vehicle information and another ECU.

Figure 3:
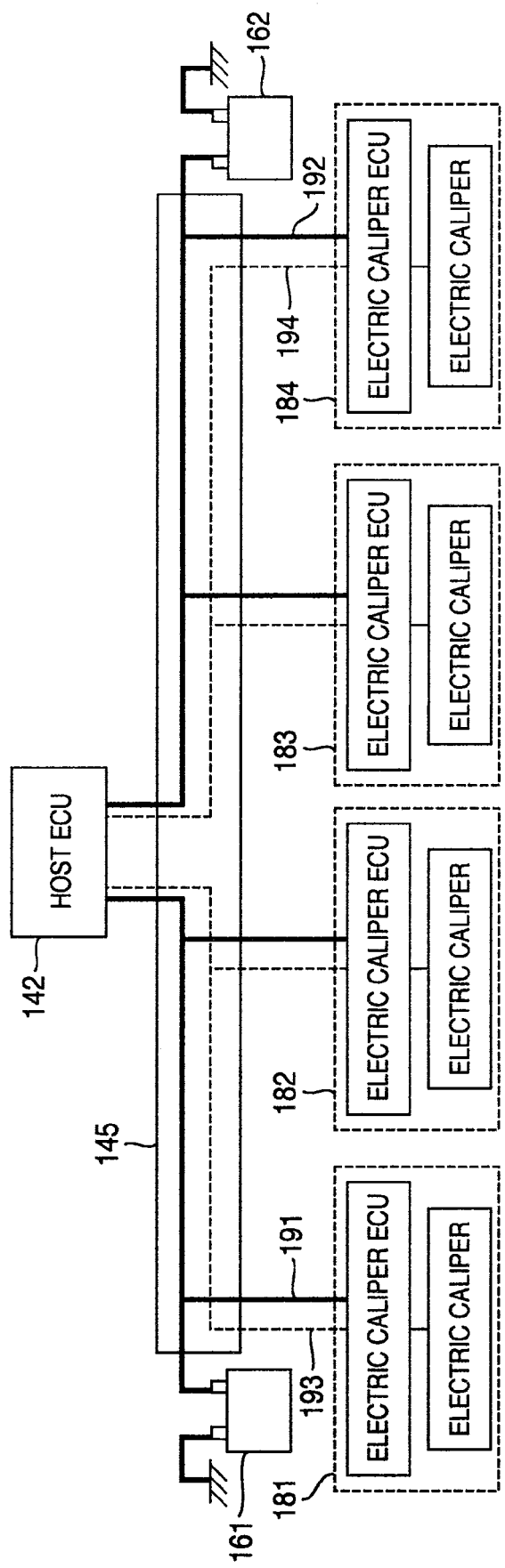
FIG. 3 shows details of a system 145 of FIG. 1.

The system 145 is constituted by multiplexing the power route and the communication route in case of failure. FIG. 3 shows details of the system 145 of FIG. 1.

In FIG. 3, electric braking apparatuses 181 and 182 are connected to a power route 191 and a communication route 193, and the power route 191 is connected to the battery 161. Moreover, electric braking apparatuses 183 and 184 are connected to a power route 192 and a communication route 194, and the power route 192 is connected to the battery 162. Since a set of two electric braking apparatuses are connected in the system 145 of FIG. 3, reliability is secured as a double system. The host ECU 142 is connected to both of the systems, but it is designed that, even if one of the systems fails, a function of the other system can be maintained.

As a constitution of the double system, for example, a front/rear double system may be constituted in which the electric braking apparatuses 181 and 182 are front-wheel apparatuses, and the apparatuses 183 and 184 are rear-wheel apparatuses, or an X-piping-line double system may be constituted in which the electric braking apparatus 181 is a front right wheel apparatus, 182 is a rear left wheel apparatus, 183 is a front left wheel apparatus and 184 is a rear right wheel apparatus.

Moreover, the battery 161 and the sub-battery 162 may have an equal voltage or a different voltage. Alternatively, for example, one of the batteries may be a 12 V battery, and the other battery may be a 36 V battery.

Furthermore, the communication routes 193, 194 are information routes which connect the host system to the electric braking apparatus in response to an electric signal, and are physically constituted of electric wires. The ECU of the host system is disposed away from the electric braking apparatuses, and information is exchanged therebetween via communication generally by use of the electric signal of a time division multiplex communication system. The electric signal for use in the communication may have a form of serial communication or multiplex communication such as CAN, FlexRay or LAN.

Figure 4:
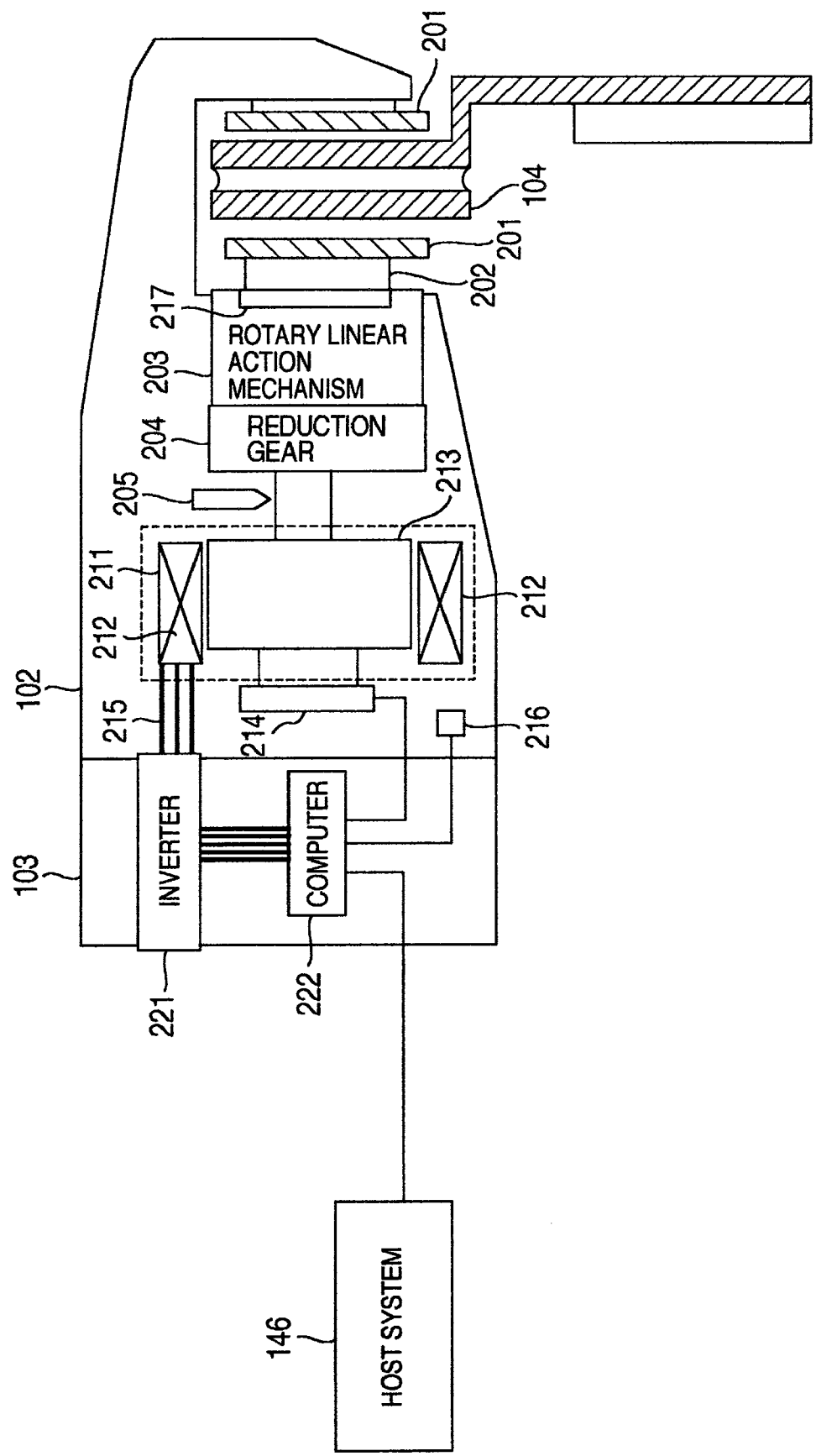
FIG. 4 shows a schematic diagram of an electric braking apparatus 101 of FIG. 1.

FIG. 4 shows a schematic diagram of the electric braking apparatus 101 of FIG. 1.

FIG. 4 shows a diagram in which the electric caliper 102 is integrated with the electric caliper ECU 103. However, the electric caliper 102 may be installed outside the vehicle cabin, and the electric caliper ECU 103 may be installed within the vehicle cabin to dispose the electric caliper 102 separately from the electric caliper ECU 103.

The electric caliper 102 presses a pad 201 onto the rotor 104, and generates the braking force or deceleration of the vehicle owing to a frictional force generated between the rotor and the pad. The pad 201 is pressed onto the rotor 104 by a piston 202. The electric caliper 102 includes an electric actuator. In FIG. 4, a motor 211 corresponds to the electric actuator. Here, the piston 202 can move in a pressing direction or a detaching direction, or increase or decrease a thrust owing to rotation or torque of the motor 211.

The rotation motion and torque of the motor 211 are decelerated by a reduction gear 204, and converted into a linear motion and a thrust force by a rotary/linear action converting mechanism 203.

Here, a relationship between the rotation of the motor 211 and movement of the piston 202 is uniquely determined by the reduction gear 204 and the rotary/linear action converting mechanism 203, and the relationship is a one-to-one correspondence. A relationship between the torque of the motor 211 and the thrust of the piston 202 is determined by the reduction gear 204 and the rotary/linear action converting mechanism 203, and the relationship is a one-to-one correspondence in an ideal state without considering friction, efficiency, temperature, hysteresis or the like. A quantitative relationship between the motor 211 and the piston 202 differs with design of the motor 211, the reduction gear 204 and the rotary/linear action converting mechanism 203, and can variously be determined in accordance with the voltage and a power capacity of the host system, a weight and weight distribution of the vehicle, the driver as a target and the like.

Here, since the rotation of the motor 211 and the movement of the piston 202 has a one-to-one correspondence, the rotation, a rotation angle, a motor rotation angle, a motor position, a piston position, a position and the like are all the same. Since the movement of the piston is a distance, the movement may be referred to as a movement distance, a position difference or the like. Furthermore, a piston speed is basically equivalent to a motor rotation angle speed, and may be used in the same meaning as that of a speed, a rotation speed, a motor speed, a motor rotation speed, a movement speed, a piston movement speed or the like.

Moreover, the thrust is a force with which the piston 202 presses the pad onto the rotor, and is the same force as a pressing force, a pressurizing force or the like. Furthermore, when the piston 202 generates the thrust to the pad 201, a pad reactive force having a magnitude equal to that of the thrust is generated from the pad 201 to the piston 202.

Furthermore, as far as the position is concerned, a direction in which the thrust increases is a pressing direction, and defined as a positive direction. In the drawing, the right side is a positive direction. Conversely, a direction in which the thrust decreases is a detaching direction, and defined as a negative direction. In the drawing, the left side is the negative direction.

In addition, when the thrust is zero, the pad 201 does not basically come in contact with the rotor 104, and the pad is disposed apart from the rotor. However, the piston 202 is not connected to the pad 201 in some case. Therefore, while the pad 201 comes in subtle contact with the rotor 104, the piston 202 comes away from the pad 201 in some case. However, in any case, such a thrust that a vehicle behavior is influenced is not generated. Therefore, distinction between a case where the pad comes away from the rotor and a case where the piston comes away from the pad does not have any meaning. Therefore, in a case where a state in which the pad comes away from the rotor is used as a condition, a state in which the piston comes away from the pad is also included in the conditions implicitly.

Here, the motor 211 may be, for example, a DC motor or a DC brushless motor. When the motor 211 is the DC brushless motor, the motor includes a motor stator 212 and a motor rotor 213. A magnet is buried in the motor rotor 213, and the rotor rotates owing to a magnetic field generated by the motor stator 212. The motor stator 212 is a coil which generates the magnetic field. When the motor 211 is the DC brushless motor, the motor stator 212 generates a rotary magnetic field owing to a three-phase current rectified by an inverter 221. Therefore, a power route 215 of the motor stator 212 and the inverter 221 includes three lines.

The electric caliper ECU 103 includes a computer 222, and the computer 222 controls the inverter 221 and a PKB mechanism 205. The computer 222 includes a volatile memory and/or a nonvolatile memory, and information can be stored. The volatile memory is a memory in which the information can be retained during starting of the system, and the nonvolatile memory is a memory in which the information can be retained during the starting of the system and even during cut-off of the system.

The PKB mechanism 205 is a mechanism capable of continuously retaining the thrust generated by the piston 202, even when any power is not supplied to the motor 211. For example, the PKB mechanism is attached to a mechanism before decelerated by the reduction gear, and may be realized by a method of continuously retaining the motor rotation angle with a pin driven by a solenoid. In the PKB mechanism 205, a PKB ON state is a state in which the thrust generated by the piston 202 is retained even in a case where any power is not supplied to the motor 211. A PKB OFF state is a state in which, when any power is not supplied to the motor 211, the piston moves in the detaching direction owing to the pad reactive force, and the thrust decreases. Here, the PKB mechanism 205 does not have to include all of the electric braking apparatuses 101, 111, 121 and 131 of FIG. 1. In general, the rear wheels include the PKB mechanism. Therefore, for example, the electric braking apparatuses 121, 111 do not include the PKB mechanism, and the only electric braking apparatuses 101, 131 may include the PKB mechanism.

Here, to apply the present invention, a load amount in a case where the electric caliper 102 generates the thrust in the piston 202 may be known. Therefore, the electric braking apparatus may include a current detection unit, and does not have to include any thrust detection unit. However, since the electric braking apparatus controls the thrust, the thrust detection unit is included in many cases. In this case, the load amount can be detected more correctly by the thrust detection unit than by the current detection unit. Therefore, a case where the thrust detection unit is not disposed will hereinafter be described separately from a case where the unit is disposed.

Figure 5:
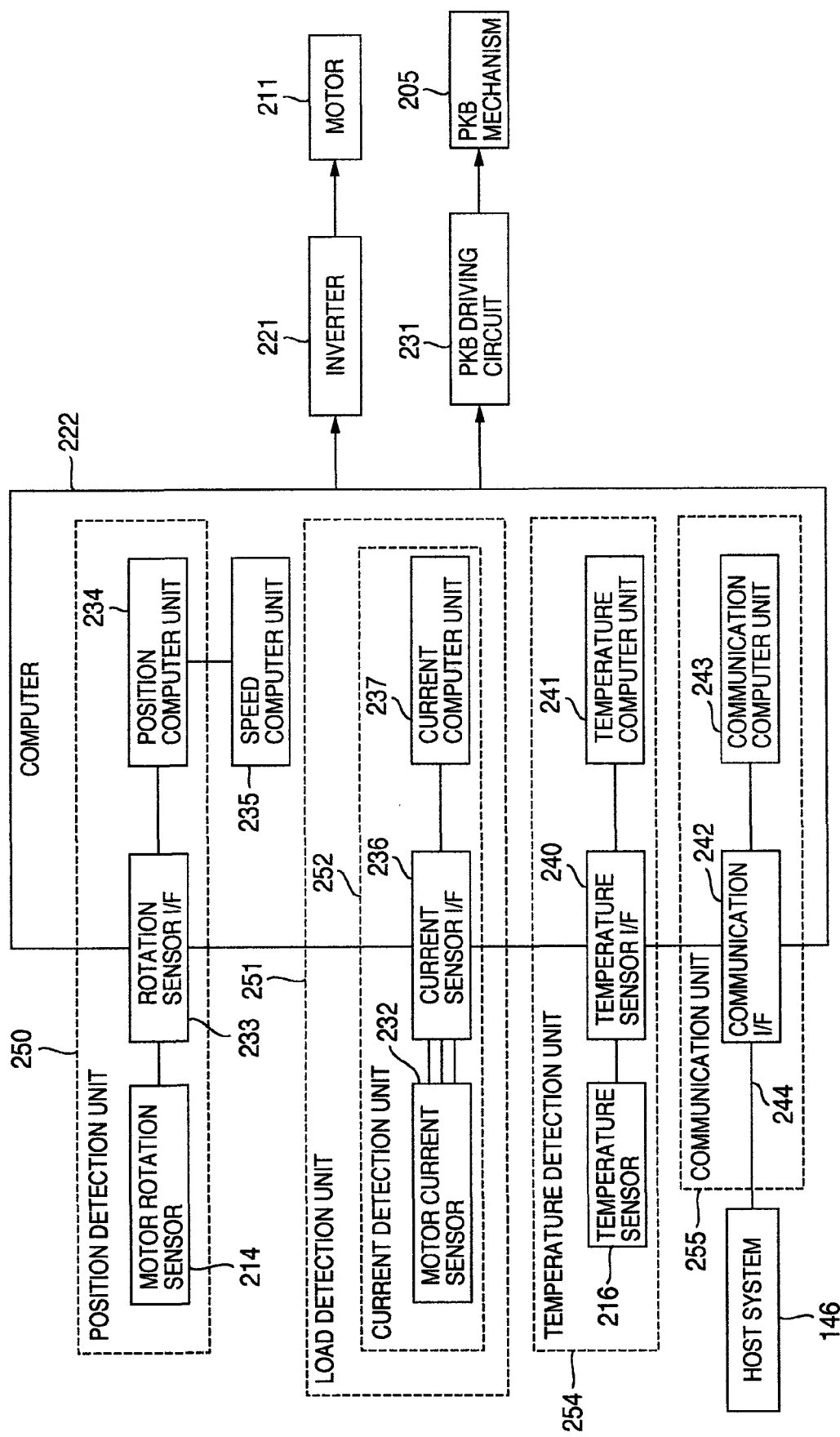
FIG. 5 shows a block diagram of the electric braking apparatus in a case where an electric caliper is not provided with a thrust detection unit.

FIG. 5 shows a block diagram of the electric braking apparatus in a case where an electric caliper is not provided with a thrust detection unit.

The computer 222 detects the piston position by use of a position detection unit 250. The position detection unit 250 includes a motor rotation sensor 214, a rotation sensor I/F 233 and a position computer unit 234. The motor rotation sensor 214 is disposed at, for example, the electric caliper 102, and can detect the rotation angle of the motor rotor 213. The motor rotation sensor 214 may be, for example, a resolver, a magnetic or optical encoder, or a hall element. For example, when the motor rotation sensor 214 is a resolver, the rotation sensor I/F 233 may be an R/D conversion circuit which converts an electric signal due to a magnetic change in a resolver element into a digital signal. The rotation sensor I/F 233 may include an input I/F which takes the digital signal converted by the R/D conversion circuit into the computer 222. For example, the rotation sensor I/F 233 may include a parallel I/F and a bus I/F. For example, the R/D conversion circuit may transmit the motor position to the computer 222 with a serial signal. The computer 222 may acquire the signal transfer from the R/D conversion circuit owing to a counter input. When the motor rotation sensor 214 is a hall element, the rotation sensor I/F 233 may be a circuit which subjects the electric signal due to the magnetic change in the hall element to signal amplification and waveform shaping, and may include an input I/F which takes the electric signal into the computer 222. In a case where the motor rotation sensor 214 is a hall element, the input I/F which takes the electric signal into the computer 222 may be, for example, a digital input I/F or an A/D converter input. Moreover, when the motor rotation sensor 214 is an encoder, the rotation sensor I/F 233 may be a conversion circuit to convert an encoder signal into an electric signal which can be taken into the computer 222, or may include an input I/F to take the electric signal into the computer 222. When the motor rotation sensor 214 is an encoder, the input I/F to take the electric signal into the computer 222 may be, for example, a counter input.

The position computer unit 234 converts the motor rotation angle taken by the rotation sensor I/F 233 into the motor or piston position. The position computer unit 234 may subject the acquired position to signal processing such as LPF to correct a noise and an error.

The computer 222 includes a speed computer unit 235. The speed computer unit 235 calculates the speed based on the position calculated by the position computer unit 234. The speed may be obtained from, for example, time differentiating of the position or a time difference.

The computer 222 includes a load detection unit 251. The load detection unit detects a load on the caliper or the motor. For example, the load detection unit 251 may include a current detection unit 252. The current detection unit 252 calculates a current which flows through the motor 211. Here, the current has a one-to-one correspondence with respect to the torque generated by the motor 211. When the motor 211 is a DC motor, the current is a current which flows through the coil. However, when the motor 211 is a DC brushless motor, the current is a Q-axis current calculated from a value of the three-phase current which flows through the motor coil and the motor rotation angle.

The current detection unit 252 includes a motor current sensor 232, a current sensor I/F 236 and a current computer unit 237. The motor current sensor 232 detects the current which flows through the motor with the hall element, a current transformer or a shunt resistance. When the motor 211 is a DC brushless motor, the current to be detected by the motor current sensor 232 is a phase current, and at least two of three phases are provided with the motor current sensor 232. When the motor 211 is a DC motor, at least one motor current sensor 232 is disposed. The current sensor I/F 236 may be a conversion circuit which converts the signal detected by the motor current sensor 232 into the electric signal to be taken into the computer 222. The current sensor I/F 236 may be an amplification circuit which amplifies the signal detected by the motor current sensor 232. The current sensor I/F 236 may be an A/D converter which takes the signal detected by the motor current sensor 232 into the computer 222.

The current computer unit 237 calculates a current corresponding to a motor torque from a signal value taken by the current sensor I/F 236. Here, when the motor 211 is a DC motor, the current corresponding to the motor torque has a current value taken by the current sensor I/F 236. When the motor 211 is a DC brushless motor, a Q-axis current calculated from the current value taken by the current sensor I/F 236 and the motor rotation angle taken by the rotation sensor I/F is a current corresponding to the motor torque.

The computer 222 may calculate a temperature of the electric caliper 102 by use of, for example, a temperature detection unit 254. The temperature detection unit 254 includes a temperature sensor 216, a temperature sensor I/F 240 and a temperature computer unit 241. The temperature sensor 216 is disposed at the electric caliper 102, and detects a temperature of the electric caliper 102 or the motor 211. The temperature sensor 216 may be, for example, a thermocouple or a thermister. The temperature sensor I/F 240 is a circuit which converts a signal detected by the temperature sensor 216 into an electric signal to be taken into the computer 222 or amplifies the signal. The temperature sensor I/F 240 may be an A/D converter which takes the signal detected by the temperature sensor 216 into the computer 222.

The temperature computer unit 241 calculates the temperature of the electric caliper 102 or the motor 211 from a signal value taken by the temperature sensor I/F 240. The temperature computer unit 241 has, for example, a heat transmission model of the electric caliper 102 or the motor 211, and may estimate the temperature of the electric caliper 102 or the motor 211 from the current detected by the current detection unit 252.

The computer 222 includes a communication unit 255 which transmits information to the host system 146. The communication unit 255 includes a communication route 244, a communication I/F 242 and a communication computer unit 243.

The communication route 244 is a route which transmits, with the electric signal, information indicated by the communication route 105 of FIG. 1 and the communication routes 193, 194 of FIG. 3. The communication I/F 242 is an I/F circuit which allows the computer 222 to communicate with the host system 146 by use of the communication route 244. The communication I/F 242 includes a driver which controls a communication protocol of the computer 222. The communication computer unit 243 changes a signal acquired from the communication route 244 into a format for use in the computer 222, or subjects the signal to signal processing such as error judgment. The communication computer unit 243 interprets an instruction of the braking force or the thrust indicated from the host system 146, or interprets an instruction to operate or release the PKB. Furthermore, the communication computer unit 243 changes a signal output from the communication route 244 into a format for use in the communication route 244, or subjects the signal to signal processing such as code addition for error detection.

The computer 222 is instructed from the host system 146 to operate the electric caliper 102, controls the inverter 221 in response to the instruction, drives the motor 211 and operates the PKB mechanism 205 by a PKB driving circuit 231.

Figure 6:
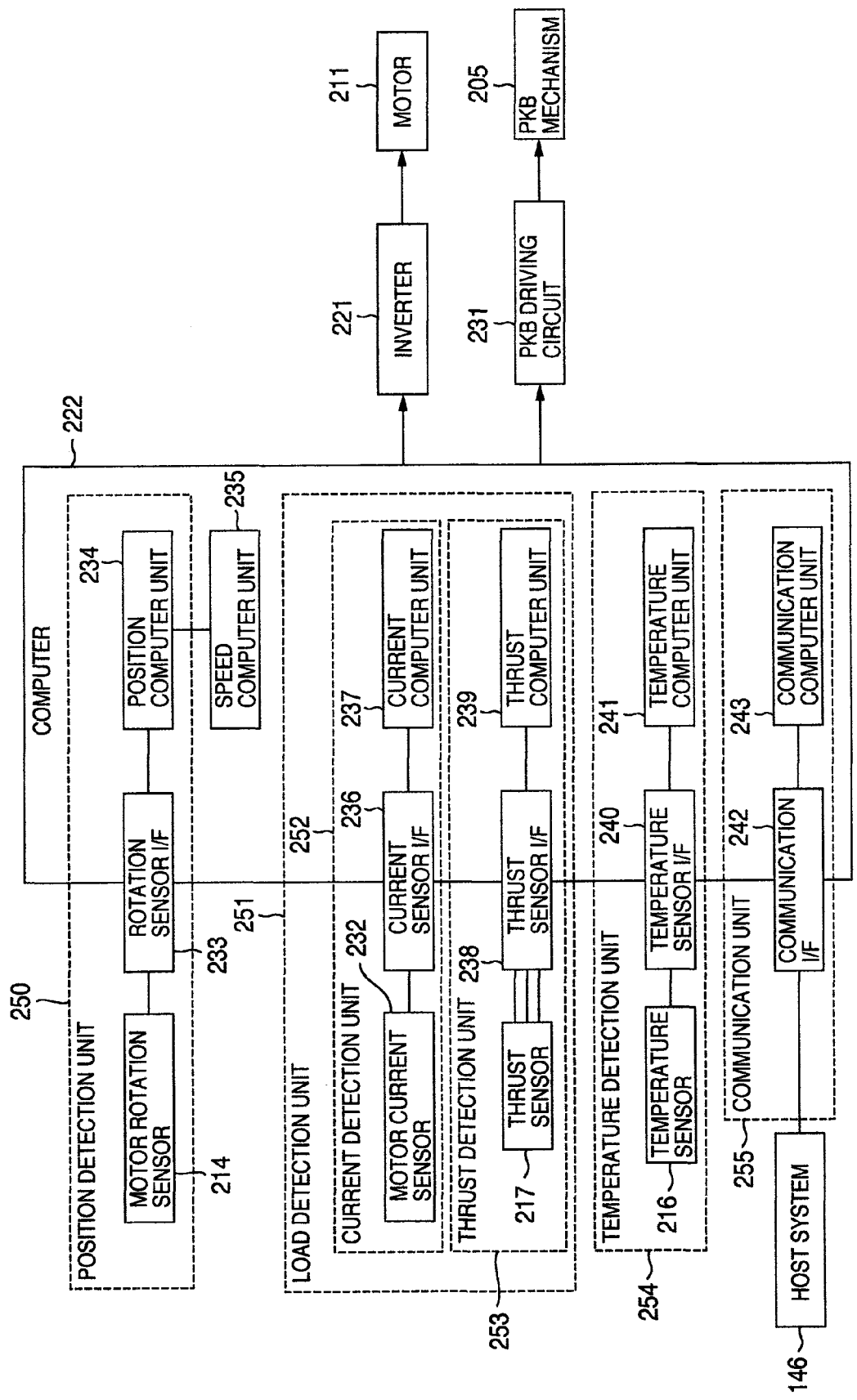
FIG. 6 shows one example of the electric braking apparatus according to one embodiment of the present invention.

FIG. 6 is a block diagram of the electric braking apparatus in a case where the electric caliper is provided with a thrust detection unit 253. The thrust estimation unit 253 is included in the load detection unit 251. The thrust estimation unit 253 includes a thrust sensor 217, a thrust sensor I/F 238 and a thrust computer unit 239.

The thrust sensor 217 is disposed at the electric caliper 102, and acquires the thrust generated by the piston 202. In the thrust sensor 217, for example, a strain gauge or the like may be used. Alternatively, a member having an elasticity coefficient known beforehand, or a sensor which measures the thrust from a strain amount may be used. The thrust sensor I/F 238 is an amplification circuit which converts the signal detected by the thrust sensor 217 into the electric signal to be taken into the computer 222 or which amplifies the signal. The thrust sensor I/F 238 may be an A/D converter which takes the signal detected by the thrust sensor 217 into the computer 222. The thrust sensor 217 may have therein an amplifier. In this case, any amplification circuit is not included in the thrust sensor I/F 238.

The thrust computer unit 239 calculates the thrust generated by the piston 202 from the signal value taken by the thrust sensor I/F 238. The thrust computer unit 239 may process the signal so as to correct the noise, the error and the like of the thrust sensor 217 and the thrust sensor I/F 238.

Figure 7:
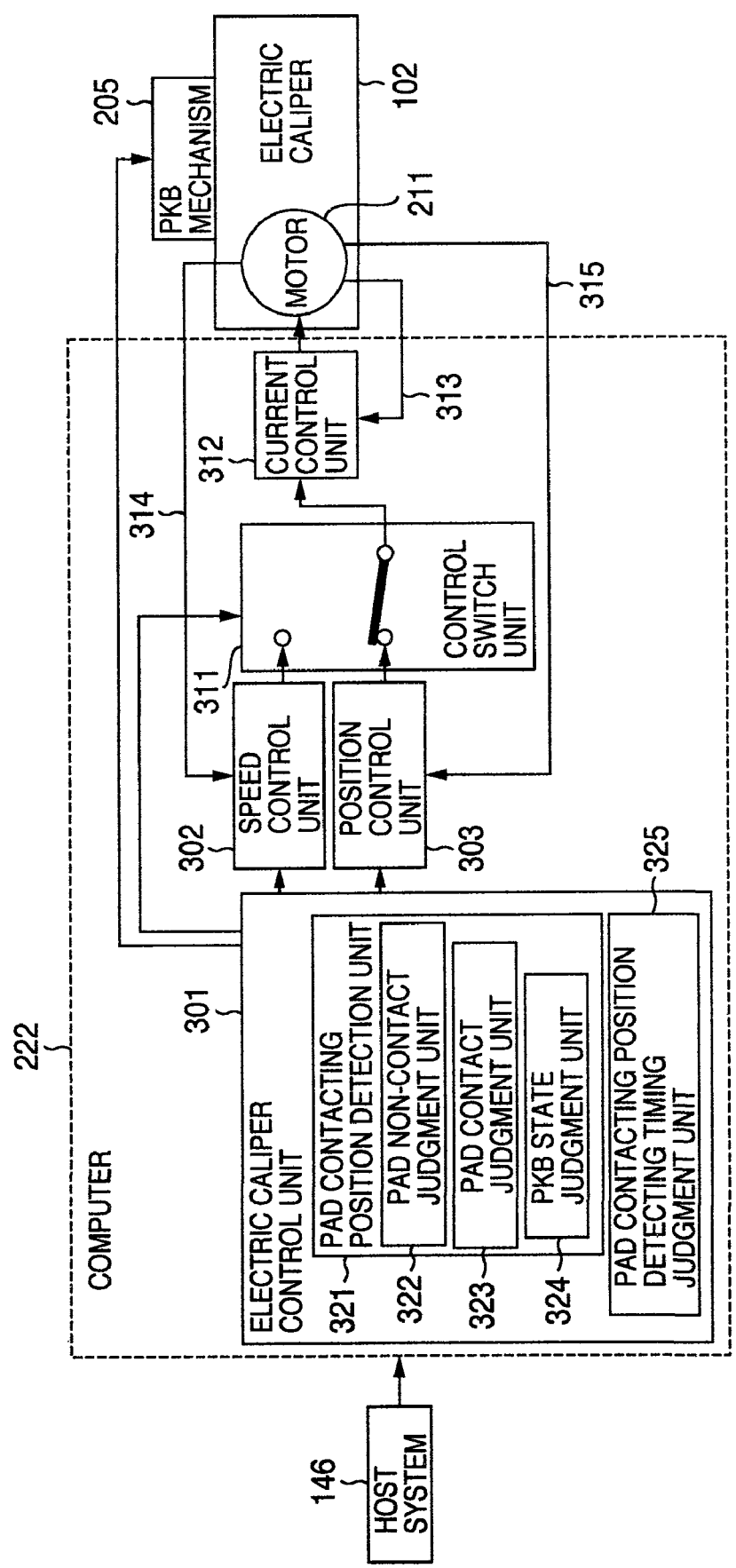
FIG. 7 is a block diagram showing one example of a computer according to one embodiment of the present invention.

Moreover, FIG. 7 is an internal block diagram of the computer 222 in a case where the electric caliper is not provided with any thrust detection unit. The computer 222 includes an electric caliper control unit 301. The electric caliper control unit 301 controls the PKB mechanism 205, switches a control switch unit 311, gives a speed instruction to a speed control unit 302, or gives a position instruction to a position control unit 303 based on the instruction from the host system.

The speed control unit 302 controls the speed in accordance with the speed instruction given from the electric caliper control unit 301 and rotation speed feedback 314 of the motor. The speed control may be, for example, P-control (Proportional Control) or the like.

The position control unit 303 controls the position in accordance with the position instruction given from the electric caliper control unit 301 and position feedback 315 of the motor. The position control may be, for example, PID control (Proportional Integral and Differential Control) or the like.

The control switch unit 311 switches use of the speed control unit 302 or the position control unit 303. Specifically, the control switch unit may input, for example, the current instruction for use output from the speed control unit 302 or the position control unit 303 into a current control unit 312.

The current control unit 312 controls the current in accordance with the current instruction input from the control switch unit 311 and current feedback 313 of the motor. The current control may be, for example, PI control (Proportional and Integral Control) or the like.

Figure 8:
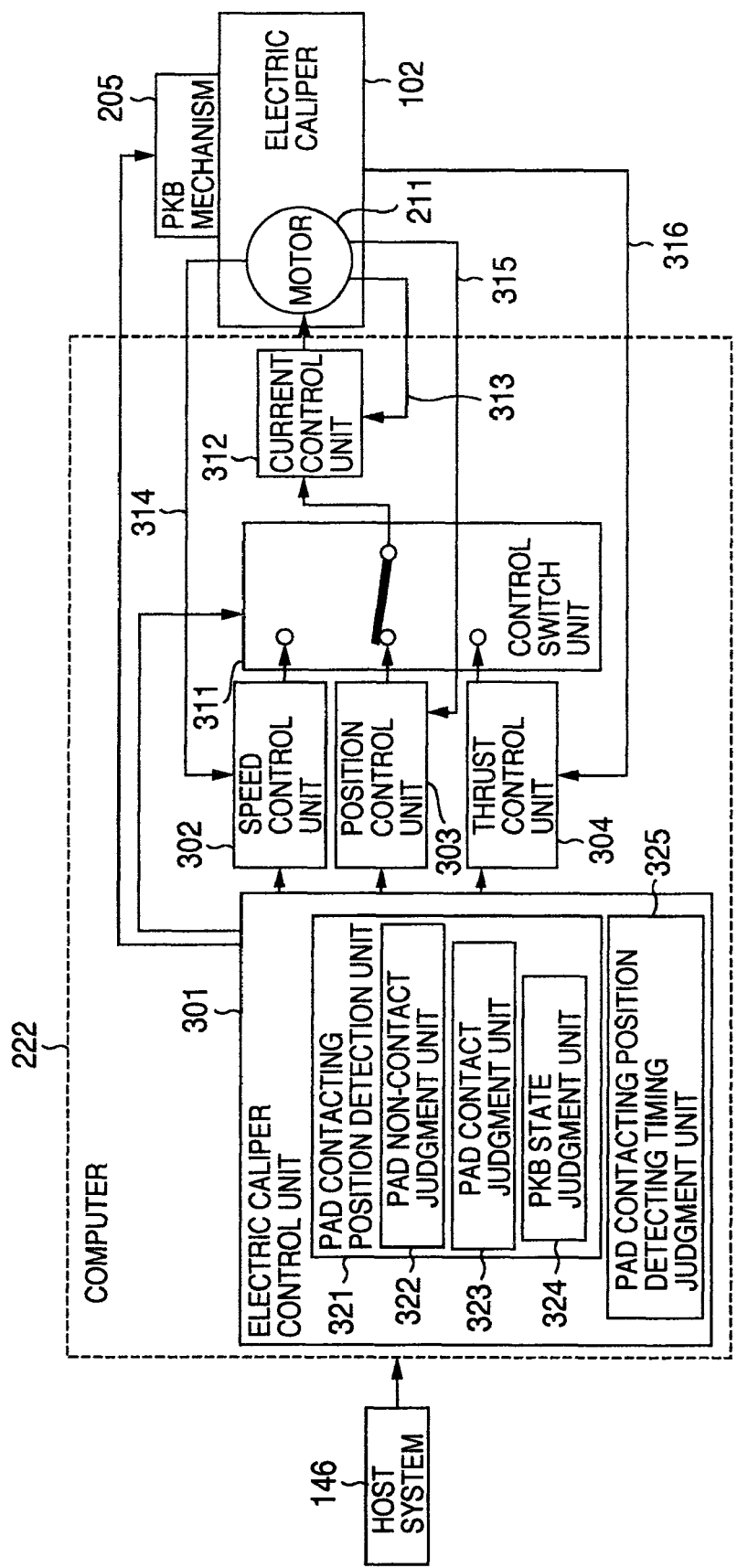
FIG. 8 is a block diagram showing one example of the computer according to one embodiment of the present invention.

Moreover, FIG. 8 is an internal block diagram of the computer 222 in a case where the electric caliper is provided with the thrust detection unit. When the caliper is provided with the thrust detection unit, a thrust control unit 304 is included. Therefore, the electric caliper control unit 301 controls the PKB mechanism 205, switches the control switch unit 311, gives the speed instruction to the speed control unit 302, gives the position instruction to the position control unit 303 or gives a thrust instruction to the thrust control unit 304 based on the instruction from the host system.

The thrust control unit 304 controls the thrust in accordance with the thrust instruction given from the electric caliper control unit 301 and thrust feedback 316. The thrust control may be, for example, PID control or the like.

The control switch unit 311 switches use of the speed control unit 302, the position control unit 303 or the thrust control unit 304. Specifically, the unit may input, for example, a current instruction for use output from the speed control unit 302, the position control unit 303 or the thrust control unit 304 into the current control unit 312.

Here, the instruction value indicated from the host system may be the thrust of the piston, the deceleration or a corresponding brake liquid pressure at a time when the brake is replaced with a conventional hydraulic brake. The instruction value indicated from the host system is converted into the speed, the position, the thrust or a state amount as a control target of the electric caliper by the electric caliper control unit 301. To convert the instruction value indicated from the host system into the state amount as the control target of the electric caliper, the value may be converted based on, for example, predetermined data. Alternatively, for example, the data for the conversion may be estimated while controlling the caliper.

Here, the electric caliper control unit 301 includes a pad contacting position detection unit 321.

The pad contacting position detection unit 321 detects a pad contacting position.

Here, assuming that the pad constantly comes in contact with the piston, the pad contacting position is a position where the pad first comes in contact with the rotor at a time when the piston is moved in a pressing direction from a state in which a clearance between the pad and the rotor opens, and a position where the pad first comes away from the rotor at a time when the piston is moved in a detaching direction from a state in which the thrust is generated. However, actually in the caliper, even when the piston is sufficiently detached, the pad comes in contact with the rotor, depending on the friction, a contact state between the pad and the piston or the like. Therefore, the pad contacting position can be defined in accordance with the thrust. When the position is defined in accordance with the thrust, the pad contacting position is a position as a boundary between a region where the thrust is zero and a region where the thrust is not zero. The origin of the position or the position 0 may be a pad contacting position.

Figure 9:
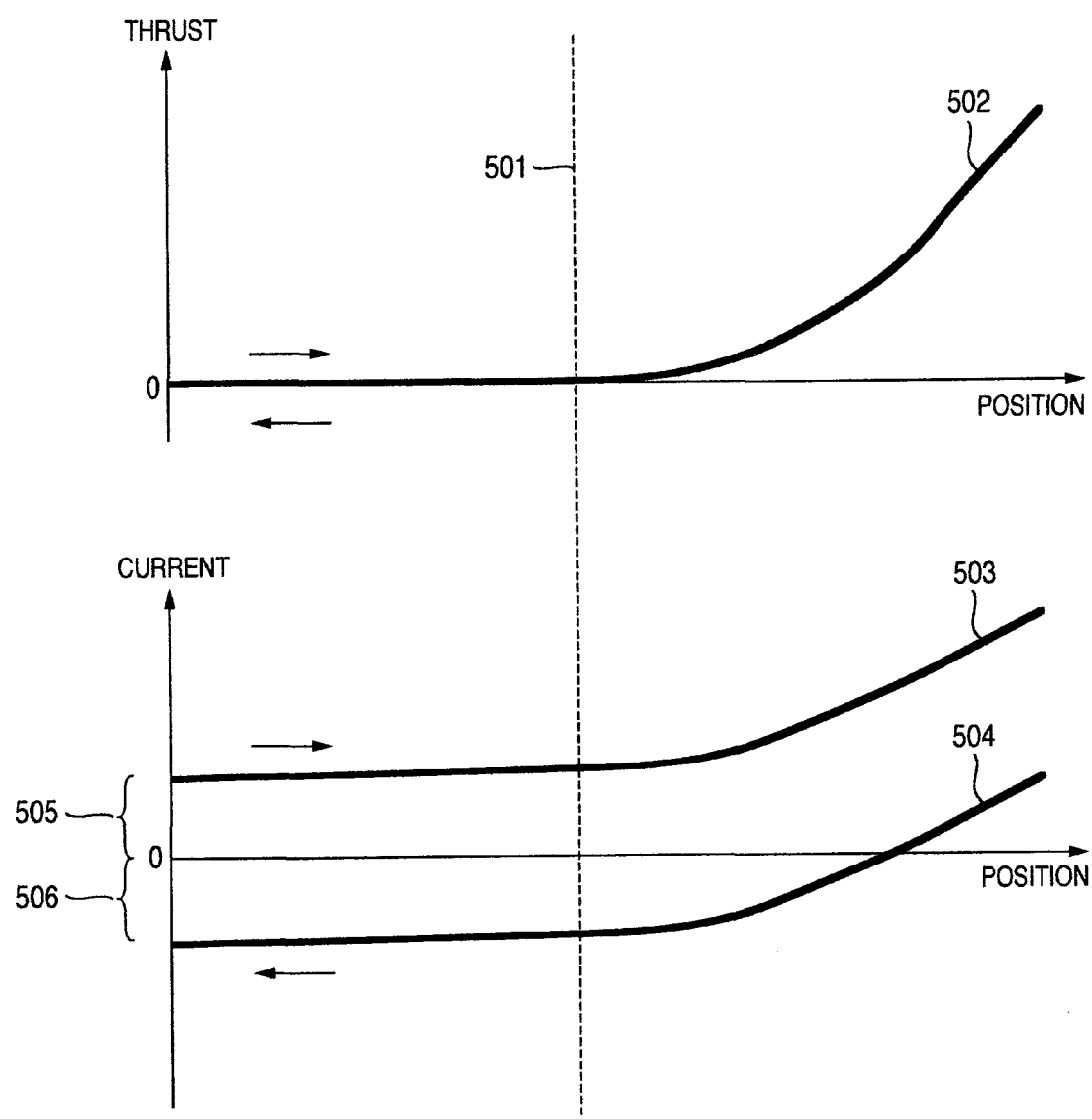
FIG. 9 is a graph showing one example of characteristics of an electric caliper.

In FIG. 9, reference numeral 502 is a relationship between the position and the thrust, 503 is a relationship between the position and the current in a case where the piston is moved in the pressing direction, and 504 is a relationship between the position and the current in a case where the piston is moved in the detaching direction.

Here, in FIG. 9, reference numeral 501 is a pad contacting position, and the thrust 504 turns to zero at a negative position from the pad contacting position, and is larger than zero at a positive position. The currents 503, 504 do not turn to zero even at the negative position from the pad contacting position. This is because the torque is required for moving the piston even when the thrust is zero owing to a frictional resistance. The current corresponding to the torque required for moving the piston in a case where the thrust is zero is denoted with 505 in a case where the piston is moved in the pressing direction, and denoted with 506 in a case where the piston is moved in the detaching direction. The currents 503, 504 have a tilt of zero at the negative position from the pad contacting position, and the tilt is larger than zero at the positive position.

When the position and the thrust of the piston are controlled in accordance with a desired value or an instruction value indicated from the host system, the pad contacting position is an important parameter.

When the piston is controlled, it is preferable that the pad contacting position is a reference of the position of the piston and that the origin or a zero point of the piston position is the pad contacting position. When the electric caliper is not provided with the thrust detection unit, the electric caliper control unit 301 controls the piston by the position control in accordance with the feedback of the position. Therefore, the pad contacting position as the origin of the control is required. Even when the electric caliper is provided with the thrust detection unit, the zero point of the thrust sensor varies with conditions such as the temperature. Therefore, in a region where the thrust is close to zero, the piston needs to be controlled based on the pad contacting position as the origin of the position.

Moreover, when the braking force does not have to be generated in the vehicle, the piston needs to be on standby at a specific position.

Here, the specific position may be, for example, the pad contacting position. For example, a position where the pad is intentionally detached from the rotor to open a clearance of about 0.5 to 1.5 mm between the pad and the rotor may be set as the specific position. When the pad is completely detached from the rotor, the rotor does not drag the pad even during the driving of the vehicle, and an effect of reducing fuel consumption or the like is obtained. Moreover, for example, a position where the pad is intentionally pressed onto the rotor to generate a small thrust of about 50 to 400 N (newton) may be set as the specific position. When the pad is completely brought into contact with the rotor, water droplets and dust can be prevented from entering a gap between the pad and the rotor, and a constant relationship between the thrust and the braking force can be retained. Here, since it is difficult to secure sufficient precision even by the thrust detection unit, it is preferable to realize the micro thrust to press the pad onto the rotor by moving the piston from the pad contacting position as much as a predetermined amount in the pressing direction.

When the braking force does not have to be generated in the vehicle, the specific position where the piston is on standby differs with a vehicle state, a surrounding environment, weather or the like, and the host system indicates the specific position to the electric braking apparatus, depending on situations.

Here, in a case where the specific position where the piston is on standby is the pad contacting position, the position where the clearance is opened or the position where the micro thrust is generated, the pad contacting position is the reference. Therefore, it is very important to detect the pad contacting position in the electric braking apparatus.

Figure 10:
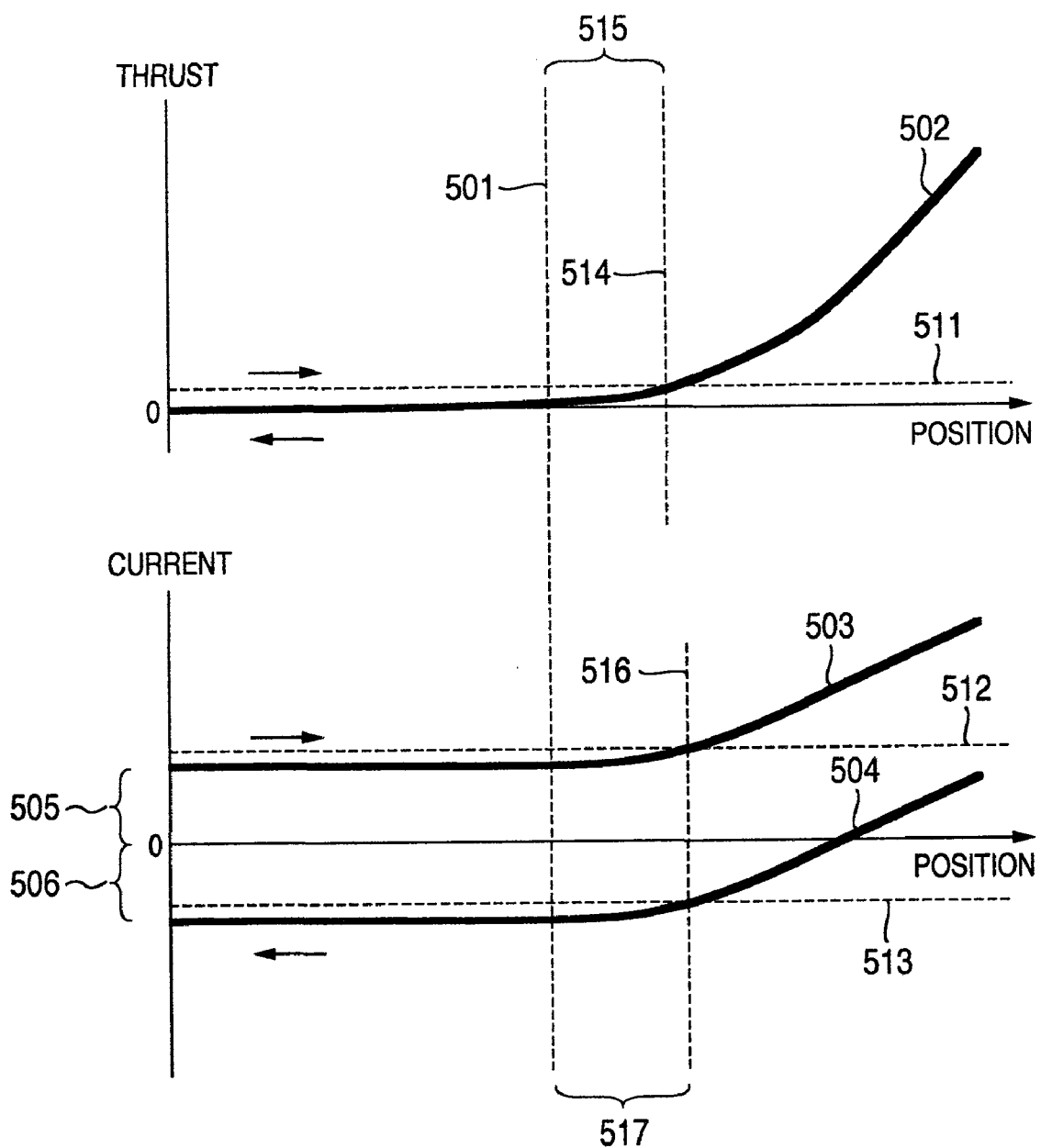
FIG. 10 is a graph showing one example of a pad contacting position detecting method.

Here, the pad contacting position can be detected from, for example, the thrust. For example, in FIG. 10, a position displaced as much as a position difference 515 from a position 514 where the thrust has a threshold value 511 may be detected as the pad contacting position. Here, it is preferable to reduce the threshold value 511 so that an influence of the thrust on a vehicle behavior can be ignored, but it is preferable to set the thrust to be so that the pad contacting position is not wrongly detected owing to the thrust detection precision or an influence of noise. The influence of the thrust on the vehicle behavior differs with the weight of the vehicle, weight distribution, a frictional material of the pad or the like. Therefore, the thrust threshold value 511 is not determined uniquely, but may be, for example, about 50 to 400 N in a general car. Here, the position difference 515 may be determined in accordance with pad rigidity, gear ratio or the like, and obtained beforehand.

Moreover, the pad contacting position may be detected with the current. When the pad contacting position is detected with the current, the threshold value differs with the moving direction of the piston. In a case where the piston moves in the pressing direction, in FIG. 10, a position displaced as much as a position difference 517 from a position 516 where the current has a threshold value 512 may be detected as the pad contacting position. In a case where the piston moves in the detaching direction, a position displaced as much as the position difference 517 from the position 516 where the current has a threshold value 513 may be detected as the pad contacting position. Here, the threshold values 512 and 513 largely differ with the gear ratio and design of the motor, and also change with the temperature, but the value may be a current value corresponding to the thrust threshold value 511. Here, the position differences 515, 517 may be determined in accordance with the pad rigidity, the gear ratio or the like, and obtained beforehand.

Here, when the pad contacting position is detected with the thrust and the thrust based on the correct zero point can be detected, the pad contacting position can be detected from the threshold value 511. However, in the thrust sensor, a measured value is provided with offset, and an offset amount sometimes drifts, depending on the temperature. The correct thrust cannot necessarily be detected in some case.

Figure 11:
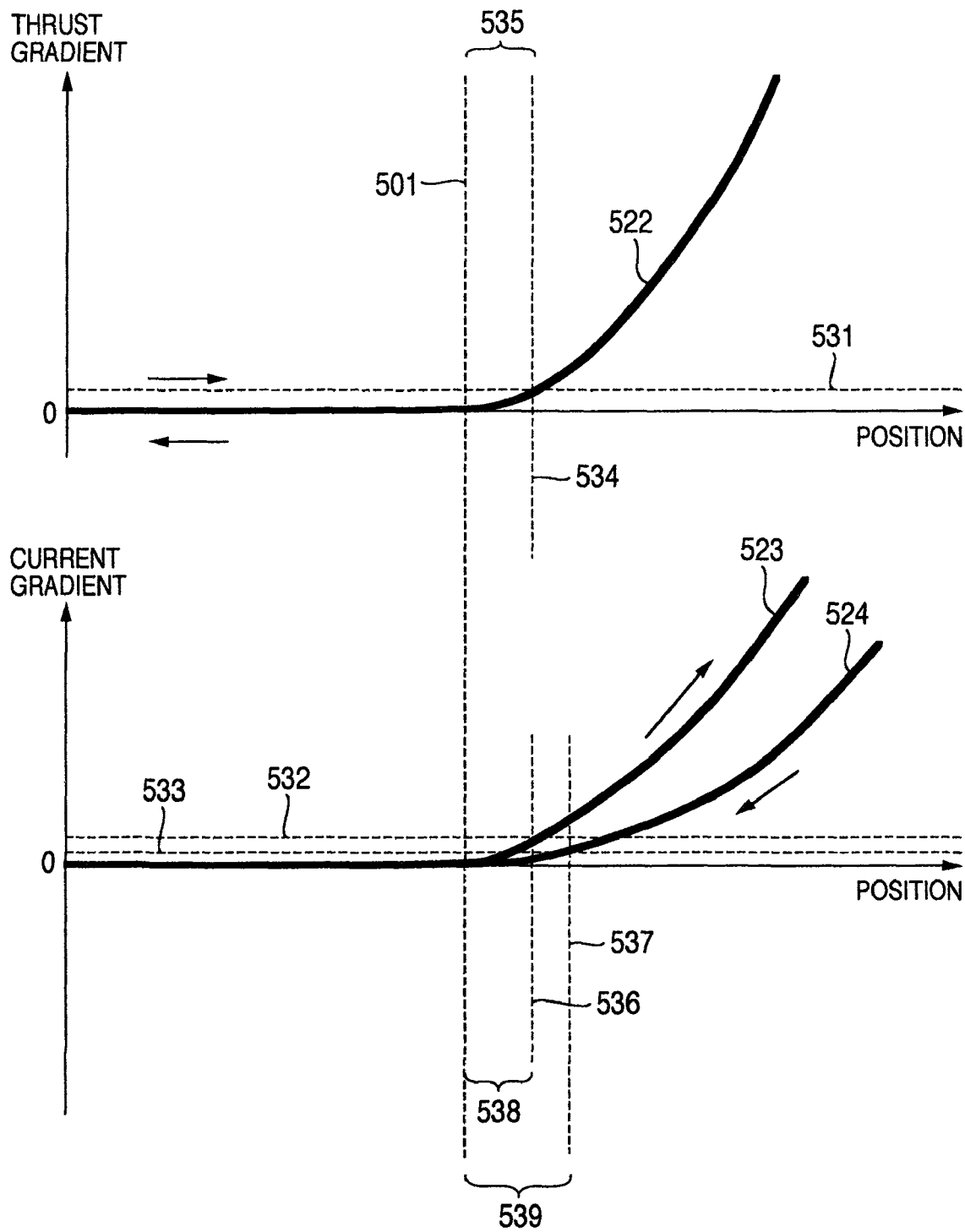
FIG. 11 is a graph showing one example of the pad contacting position detecting method.

When the thrust based on the correct zero point cannot be detected, as shown in, for example, FIG. 11, a method of detecting the pad contacting position from a thrust gradient may be performed.

In FIG. 11, reference numeral 522 is a thrust gradient with respect to the position. In a case where the pad contacting position is detected in accordance with the thrust gradient, for example, a position displaced as much as a position difference 535 from a position 534 where the thrust gradient has a threshold value 531 may be detected as the pad contacting position.

Here, the threshold value 531 and the position difference 535 are determined in accordance with the pad rigidity, the gear ratio or the like, and obtained beforehand, but it is preferable to reduce the thrust to such an extent that an influence of the thrust generated during detection on the vehicle behavior can be ignored. In the general car, the threshold value of the thrust gradient may be determined so that the thrust generated during the detection is about 50 to 400 N or less.

Moreover, when the pad contacting position is detected in accordance with the current and the current 505 or 506 at a time when the correct current and thrust are zero is known, the pad contacting position can be detected in accordance with the threshold values 512, 513. However, even in the current sensor, a measured value is provided with offset, or a detected value varies with the temperature and a power voltage fluctuation in some case. The correct current cannot necessarily be detected in some case. Even with the current 505 or 506, it is difficult to quantitatively grasp an amount of the frictional resistance beforehand. It is also difficult to predict the fluctuation in accordance with the temperature or the like in many cases. When the correct current cannot be sensed and the current 505 or 506 is not clarified, the pad contacting position may be detected from a current gradient as in, for example, FIG. 11.

In FIG. 11, reference numeral 523 is a current gradient with respect to the position at a time when the piston moves in the pressing direction. Moreover, 524 is a current gradient with respect to the position at a time when the piston moves in the detaching direction. When the piston moves in the pressing direction, a position displaced as much as a position difference 538 from a position 536 where the current gradient has a threshold value 532 may be detected as the pad contacting position. When the piston moves in the detaching direction, for example, a position displaced as much as a position difference 539 from a position 537 where the current gradient has a threshold value 533 may be detected as the pad contacting position.

Here, the threshold values 532, 533 largely differ with the gear ratio and the design of the motor, and also change with the temperature, but the current gradient may correspond to the thrust gradient threshold value 531. Here, the position differences 536, 537 may be determined in accordance with the pad rigidity, the gear ratio or the like, and obtained beforehand.

Furthermore, the pad contacting position may be detected from, for example, the thrust gradient and the current gradient with respect to time. Here, the value of the gradient with respect to the time changes to be positive or negative in accordance with a proceeding direction of the piston, but for the sake of simplicity, an absolute value may be used in the gradient with respect to the time.

Figure 12:
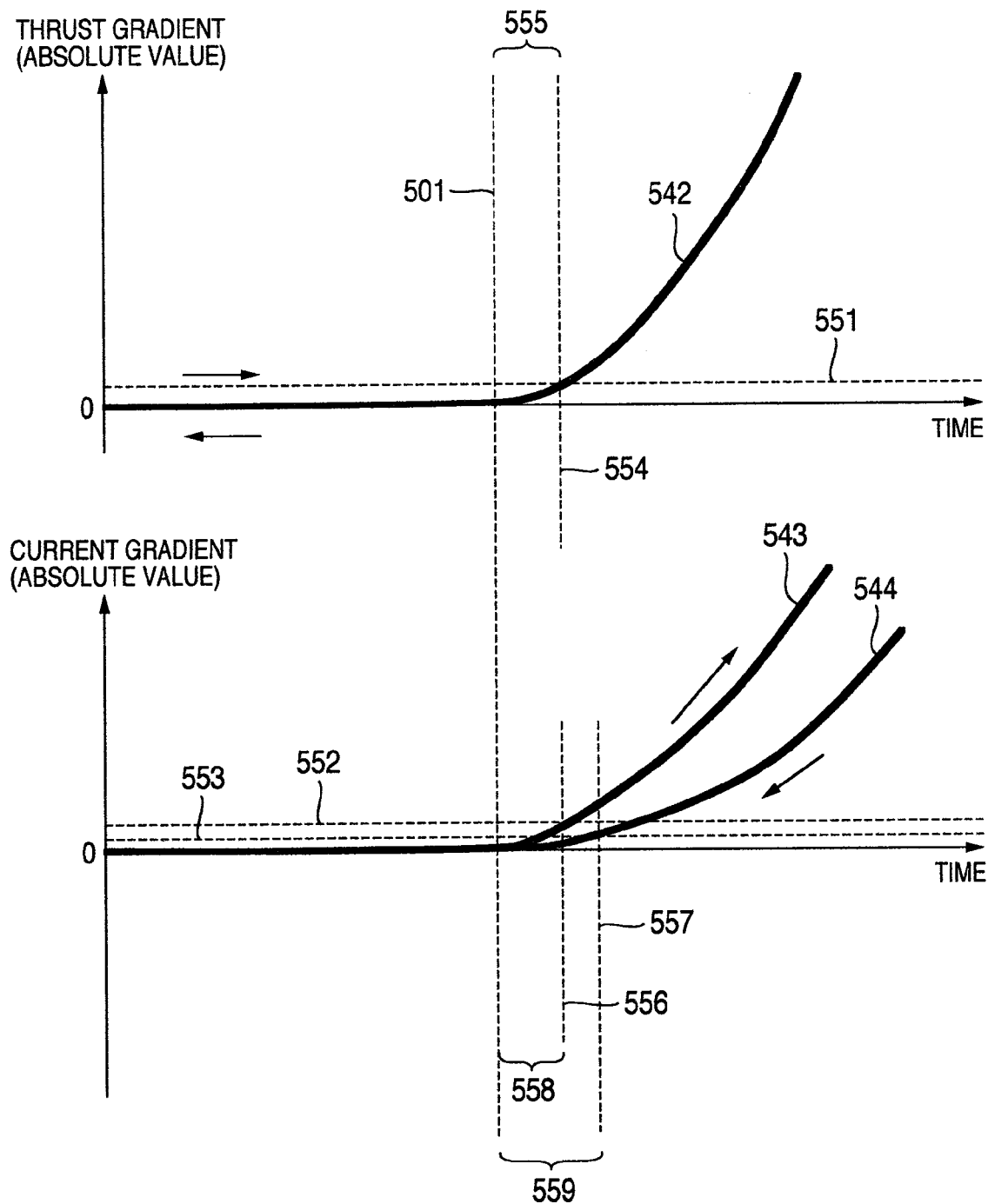
FIG. 12 is a graph showing one example of the pad contacting position detecting method.

In FIG. 12, reference numeral 542 is a thrust gradient with respect to the time, and 543, 544 are current gradients with respect to the time.

In a case where the pad contacting position is detected from the thrust gradient, a position displaced as much as a position difference 555 from a position 554 where the thrust gradient has a threshold value 551 may be detected as the pad contacting position.

In a case where the pad contacting position is detected from the current gradient, when the piston moves in the pressing direction, for example, a position displaced as much as a position difference 558 from a position 556 where the current gradient has a threshold value 552 may be detected as the pad contacting position. When the piston moves in the detaching direction, for example, a position displaced as much as a position difference 559 from a position 557 where the current gradient has a threshold value 553 may be detected as the pad contacting position.

Here, the threshold values 551, 552 and 553 and the position differences 555, 558 and 559 largely differ with the pad rigidity, the gear ratio, the design of the motor or the like, and also change with the temperature, but it is preferable to reduce the thrust generated during the detection so that the influence of the thrust on the vehicle behavior can be ignored. In the general car, the threshold value may be described so that the thrust generated during the detection is about 50 to 400 N or less.

To detect the pad contacting position from the gradient of the current or the thrust with respect to the position or the time, the piston has to be moved so that the current or the thrust is provided with the gradient. Here, to detect the pad contacting position by use of the thrust gradient, even when the piston is operated from the position on a detaching side from the pad contacting position to the position on a pressing side from the pad contacting position, or even when the piston is operated from the position on the pressing side from the pad contacting position to the position on the detaching side from the pad contacting position, the pad contacting position can be detected from the equal threshold value.

However, to detect the pad contacting position by use of the current gradient, when the piston is operated from the position on the detaching side from the pad contacting position to the position on the pressing side from the pad contacting position, and when the piston is operated from the position on the pressing side from the pad contacting position to the position on the detaching side from the pad contacting position, the threshold value for detecting the pad contacting position differs.

Here, in a case where the pad contacting position is detected from the current gradient, since the piston needs to be moved on conditions that the frictional resistance does not fluctuate owing to the speed and that the current does not fluctuate owing to acceleration/deceleration of the piston, the piston needs to be moved at a constant speed during the detection of the pad contacting position. Even in a case where the pad contacting position is detected from the thrust gradient, in order to reduce the influence of the noise and the like, a method of moving the piston at the constant speed to detect the pad contacting position is effective.

The piston moves in order to generate the thrust in a usual brake operation for generating the braking force in the vehicle. However, the piston is hardly moved at the constant speed during such a usual brake operation. Therefore, the pad contacting position detection unit controls the piston so as to perform a piston operation for the detection of the pad contacting position separately from a piston operation to be performed to generate the braking force and the thrust. Here, the piston operation for the detection of the pad contacting position is performed at a timing when the braking force or the thrust does not have to be generated, and the piston is operated to reduce an influence of the piston operation for the detection of the pad contacting position on the vehicle behavior so that the influence can be ignored.

Here, in pad contacting position detection processing, it is necessary to consider a possibility that the thrust is not zero at start of the piston operation. This is supposedly, for example, a case where the piston actually generates the thrust even at a time when an error is generated in detecting the absolute value of the thrust or the current and the thrust or the current recognized by the computer is zero. There is also supposedly, for example, a case where the motor is not energized for a certain reason, the piston moves in the detaching direction owing to a reactive force of the pad, and a residual thrust remains to be left to stop the motor. In a case where the thrust is not zero at the start of the pad contacting position detection processing, when the piston is moved in the pressing direction for the detection of the pad contacting position, the thrust increases, and the vehicle behavior is influenced. Therefore, to detect the pad contacting position, the pad contacting position detection unit first moves the piston in the detaching direction or passes the current through the motor in order to move the piston in the detaching direction. Here, when the thrust is not zero at the start of the pad contacting position detection processing, it is possible to detect the pad contacting position while the piston moves in the detaching direction.

Figure 13:
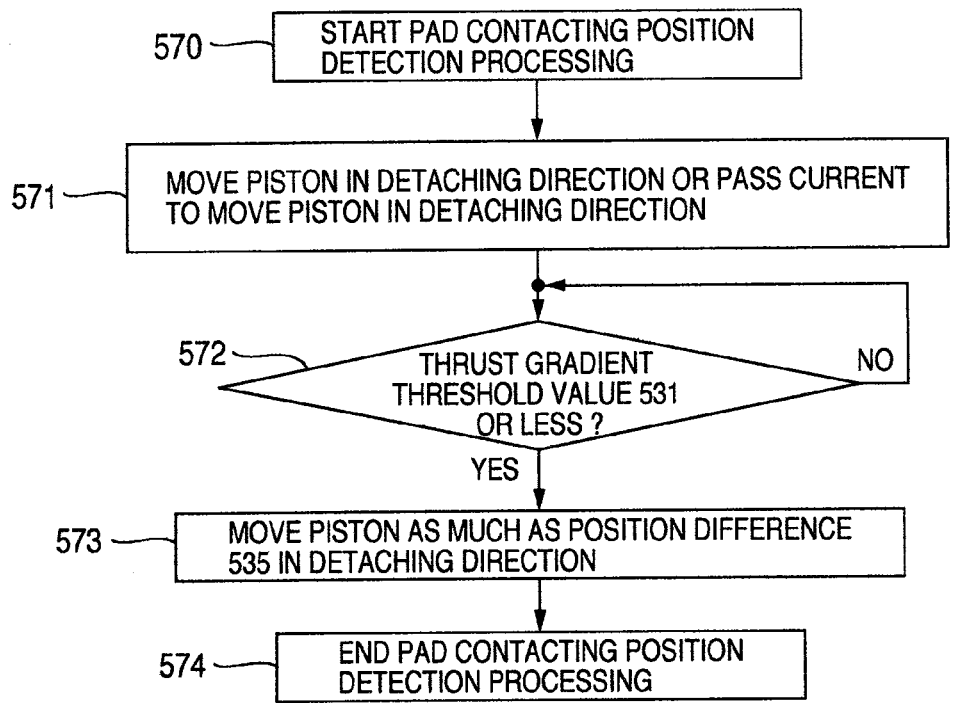
FIG. 13 is a data flow chart showing one example of the pad contacting position detecting method.

FIG. 13 shows a data flow in a case where the pad contacting position detection processing is performed based on the thrust gradient of FIG. 11 at a time when the thrust is not zero at the start of the pad contacting position detection processing. In FIG. 13, after starting the pad contacting position detection processing in step 570, the piston is moved in the detaching direction, or the current to move the piston in the detaching direction is passed in step 571. In the step 571, a speed at which the piston is moved in the detaching direction is set to be constant. Subsequently, when the thrust gradient has a value below the threshold value 531 in step 572, the piston is moved as much as the position difference 535 in the detaching direction in step 573, and the pad contacting position detection processing is completed in step 574.

Figure 14:
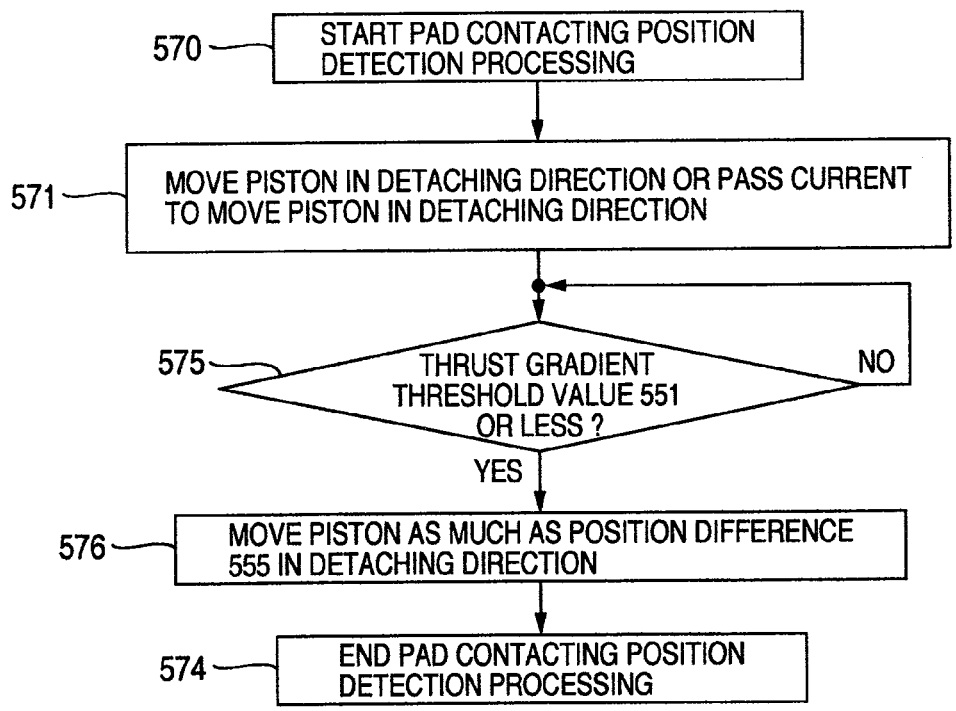
FIG. 14 is a data flow chart showing one example of the pad contacting position detecting method.

Moreover, FIG. 14 shows a data flow in a case where the pad contacting position detection processing is performed based on the thrust gradient of FIG. 12. When the thrust gradient of FIG. 12 is used and the thrust gradient has a value below the threshold value 551 in step 575, the piston is moved as much as the position difference 555 in the detaching direction in step 576.

Figure 15:
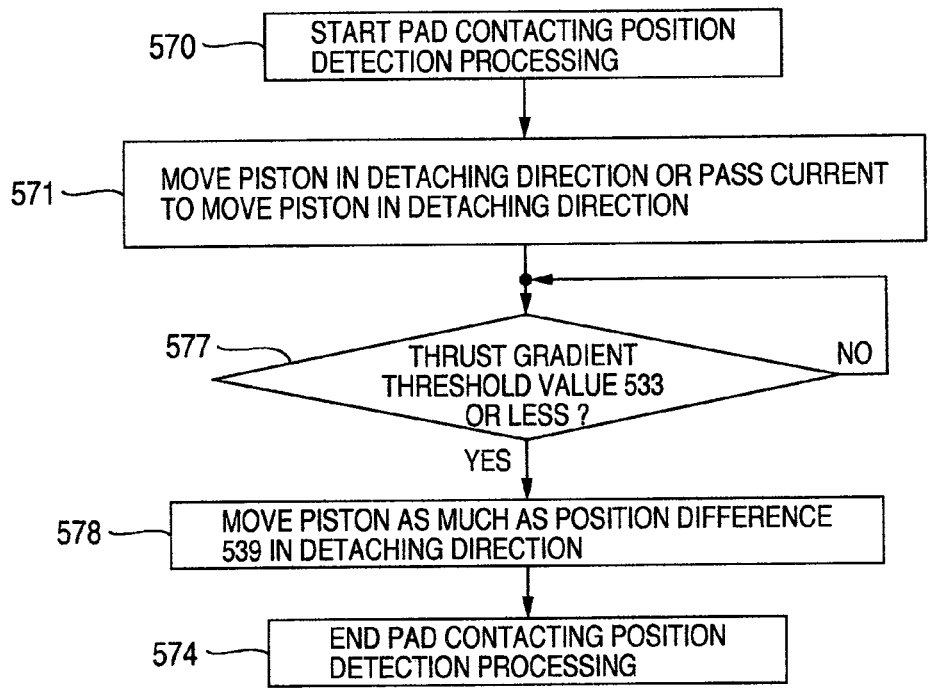
FIG. 15 is a data flow chart showing one example of the pad contacting position detecting method.

Furthermore, FIG. 15 shows a data flow in a case where the pad contacting position detection processing is performed based on the current gradient of FIG. 11. When the current gradient of FIG. 11 is used and the current gradient has a value below the threshold value 533 in step 577, the piston is moved as much as the position difference 538 in the detaching direction in step 578.

Figure 16:
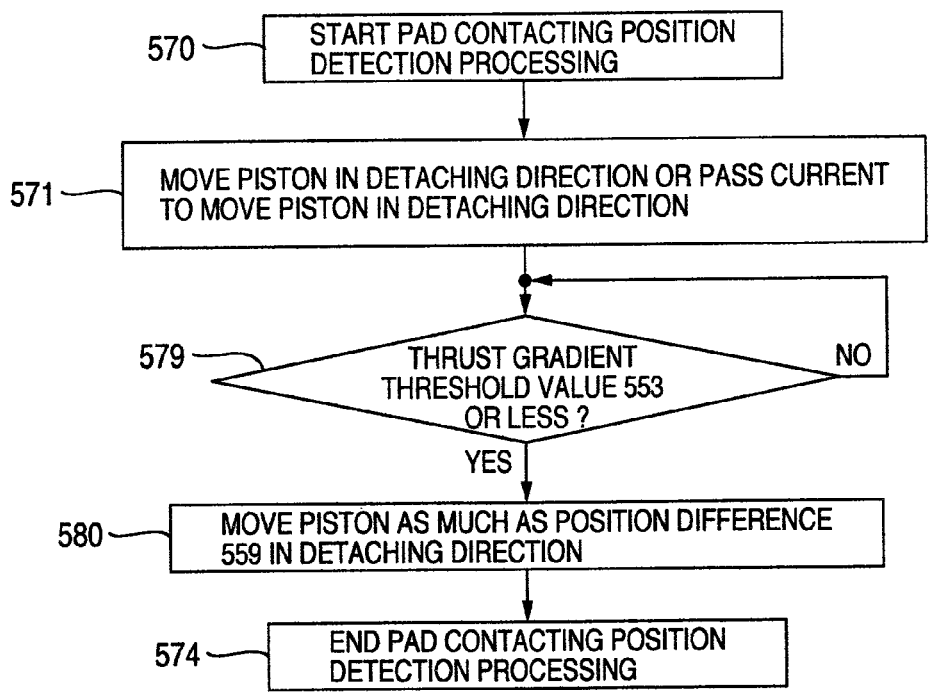
FIG. 16 is a data flow chart showing one example of the pad contacting position detecting method.

In addition, FIG. 16 shows a data flow in a case where the pad contacting position detection processing is performed based on the current gradient of FIG. 12. When the current gradient of FIG. 12 is used and the current gradient has a value below the threshold value 553 in step 579, the piston is moved as much as the position difference 558 in the detaching direction in step 580.

Moreover, during this pad contacting position detection processing, it is necessary to consider a possibility that the piston position is displaced from the pad contacting position at the start of the pad contacting position detection processing. This is supposedly, for example, a case where a position where the piston is on standby at a time when any braking force does not have to be generated is a position where a clearance between the pad and the rotor is opened. This is also supposedly, for example, a case where the motor is not energized for some cause, and the piston is moved apart from the pad contacting position owing to the reactive force of the pad.

When the piston position is displaced from the pad contacting position at the start of the pad contacting position detection processing, the pad contacting position cannot be detected while moving the piston in the detaching direction as shown in FIGS. 13, 14, 15 and 16.

Therefore, it is preferable to detect the pad contacting position while the piston is moved in the pressing direction. The thrust generated in this case needs to be reduced so that the influence of the thrust on the vehicle behavior can be ignored.

In a case where the pad contacting position detection processing is actually performed, it cannot be judged in many cases whether or not the thrust is generated or whether or not the piston position is displaced from the pad contacting position. Therefore, the pad contacting position detection unit operates the piston so as to cope with either case.

Figure 17:
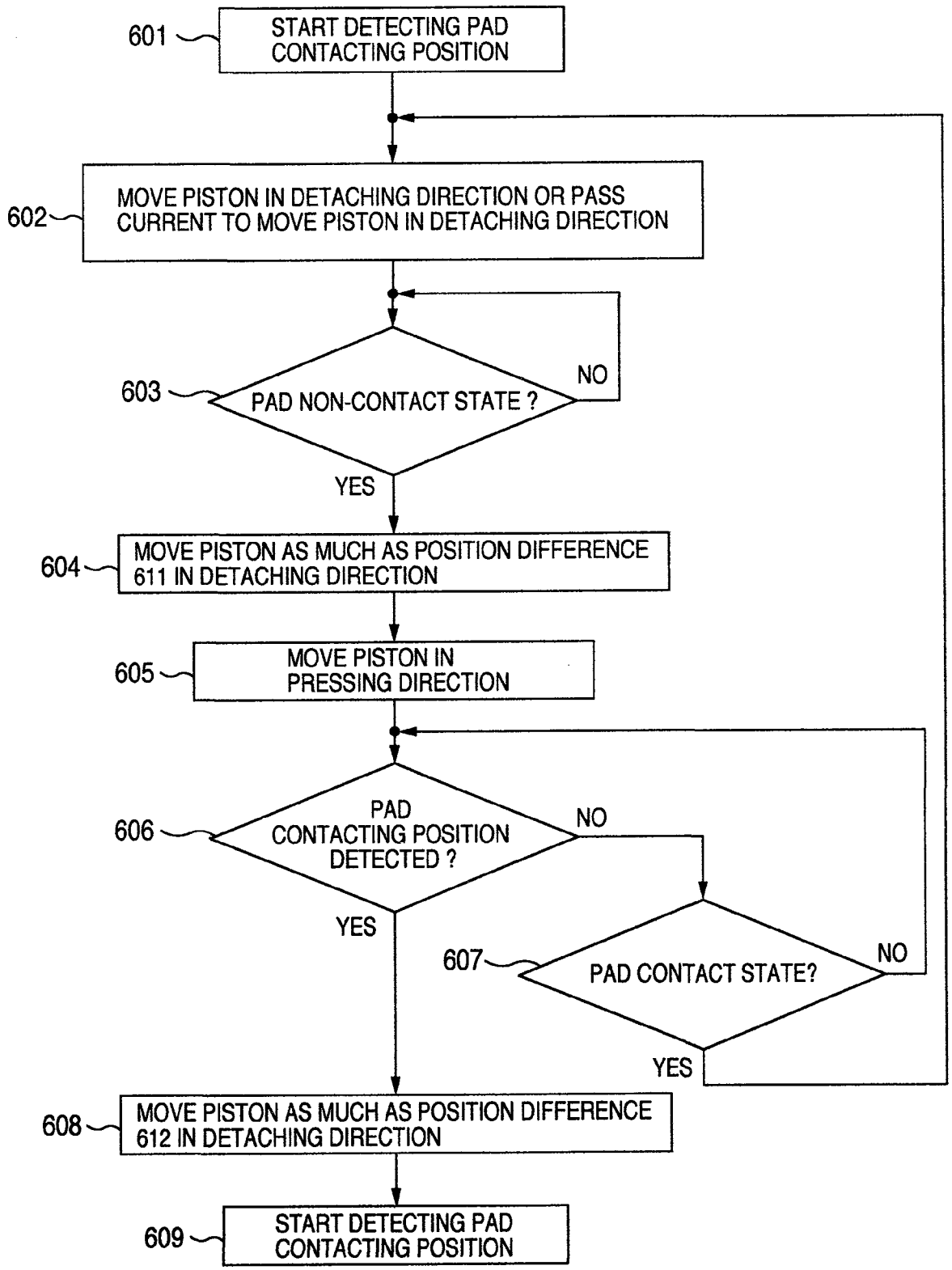
FIG. 17 is a data flow chart showing one example of the pad contacting position detecting method.

Specifically, the pad contacting position detection unit may operate the piston in accordance with a data flow shown in, for example, FIG. 17.

In the pad contacting position detection processing, when the pad contacting position detection unit starts detecting the pad contacting position in step 601, the unit moves the piston in the detaching direction or passes the current to move the piston in the detaching direction in step 602. Here, the piston moves at the constant speed in order that the thrust gradient and the current gradient are detected as correctly as possible while the piston moves in the detaching direction. The speed at which the piston moves in the detaching direction differs with a constitution of the caliper and motor characteristics, but it is preferable to use a predetermined speed of about 50 to 500 rpm in terms of the motor rotation speed.

When a large thrust is generated at the start of the pad contacting position detection processing, the current is sometimes passed in a positive direction in the step 602. This is because, while the force to move the piston in the detaching direction is exerted owing to the reactive force of the pad, the movement speed of the piston is set to be constant. However, generally in the step 601, the small thrust is generated or any thrust is not generated in many cases. In this case, the current to move the piston in the detaching direction is passed in a negative direction in the step 602. In a case where the PKB has an ON-state in the step 601, even when the large thrust is generated, the force to move the piston in the detaching direction due to the reactive force of the pad is not exerted. Therefore, the current is passed in the negative direction in the step 602.

Here, the pad contacting position detection unit 321 includes a pad non-contact judgment unit 322.

When the piston moves in the detaching direction in the step 602, the pad non-contact judgment unit 322 performs pad non-contact judgment processing in step 603. The pad non-contact judgment unit judges whether or not the pad has a non-contact state. In the pad non-contact state, the pad comes away from the rotor, and the thrust surely turns to zero. In the pad non-contact judgment processing, the pad non-contact state can ideally be judged by judging that the thrust gradient or the current gradient turns to zero. However, in actual, the detected thrust gradient or current gradient is rippled or undulated owing to noise of a load detection unit, torque fluctuations due to mechanical and electrical constitutions of the caliper and the motor or the like. Therefore, even when the thrust gradient or the current gradient turns to zero, it cannot be judged that the pad comes away from the rotor, the thrust turns to zero and the pad is securely in the non-contact state. Here, the pad non-contact judgment processing may be a state in which it is not judged that the pad has the non-contact state, while the pad comes away from the rotor and the thrust turns to zero. However, during the pad non-contact judgment processing, since the thrust influencing the vehicle behavior is not generated in the pad contacting position detection processing, it must not be judged that a state in which the pad comes in contact with the rotor to set the thrust to zero is the pad non-contact state.

Figure 18:
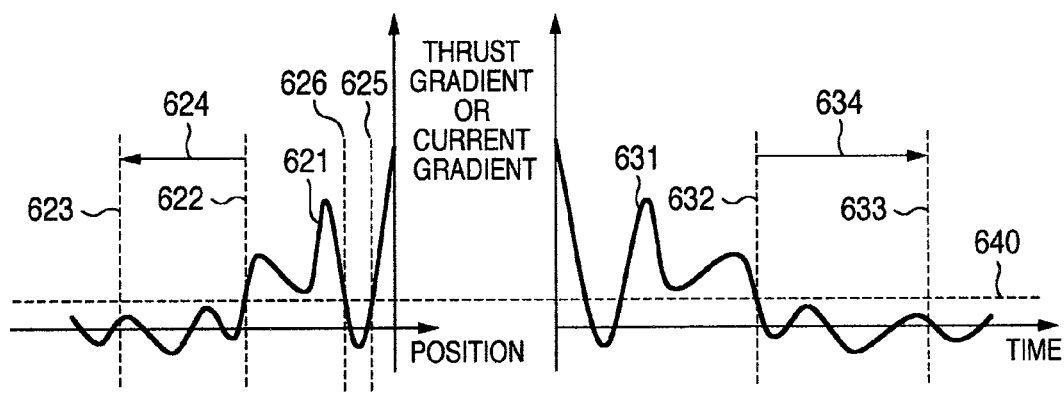
FIG. 18 is a graph showing one example of the pad contacting position detecting method.

To solve the problem, the pad non-contact judgment unit 322 may perform the pad non-contact judgment processing by, for example, a method shown in FIG. 18. In FIG. 18, reference numeral 621 is one example of a relationship between the thrust gradient or the current gradient and the position. In FIG. 18, 631 is one example of a relationship between the thrust gradient or the current gradient and the position. When the pad non-contact judgment processing is performed based on the relationship 621, it is judged that the pad has the non-contact state on conditions that the current gradient or the thrust gradient has a threshold value 640 or less and that the piston moves as much as a position difference 624 in the detaching direction. Here, the current gradient or the thrust gradient has the threshold value 640 or less at a position 625, but the current gradient or the thrust gradient has the threshold value 640 or more at a position 626. Therefore, it is not judged that the pad has the non-contact state. However, while the position difference is 624 or more from a time when the current gradient or the thrust gradient has the threshold value 640 or less at a position 622, the current gradient or the thrust gradient continues to have the threshold value 640 or less. Therefore, it is judged at a position 623 that the pad has the non-contact state. In a case where the pad non-contact judgment processing is performed based on the relationship 631, it is judged that the pad has the non-contact state on conditions that the current gradient or the thrust gradient has the threshold value 640 or less and that the piston moves in the detaching direction for a time 634 or more. In FIG. 18, the current gradient or the thrust gradient has the threshold value 640 or less at a time 632, and it is judged at a time 633 that the pad has the non-contact state.

Here, to securely judge that the pad has the non-contact state, the threshold value 640 is set to be smaller than the threshold value 531, 533 of FIG. 11 or the threshold value 551, 553 of FIG. 12. The position difference 624 and the time 634 are set to be larger than a period of ripple, crest or undulation of the current gradient or the thrust gradient detected in the vicinity of the pad contacting position. Here, for example, when the ripple, crest or undulation of the current gradient or the thrust gradient is synchronized with the rotation angle of the motor, for example, the position difference 624 and the time 634 may be set to an arbitrary value at about ¼ to 2 rotations of the motor.

In a case where it is judged in the step 603 of FIG. 17 that the pad has the non-contact state, the piston moves as much as a position difference 611 in the detaching direction in step 604. When the piston moves as much as the position difference 611 in the detaching direction from a position where it is judged that the pad has the non-contact state, the piston is moved in the pressing direction in step 605. When the piston moves in the pressing direction in the step 605, the movement speed is set to be constant in order to detect the thrust gradient or the current gradient as correctly as possible. A speed at which the piston moves in the pressing direction differs with the constitution of the caliper and the motor characteristics, but it is preferable to use a predetermined speed of about 50 to 500 rpm in terms of the number of the motor rotations. In the step 604, the piston is moved as much as the position difference 611 in the detaching direction in order to secure, beforehand in the detaching direction, a movement distance required for performing judgment processing and detection processing of steps 606, 607 from a time when the piston starts moving in the pressing direction at the step 605. A reason why the required movement distance is secured here is that data of the piston which has moved as much as a certain degree of movement distance is required for accelerating the motor and for performing signal processing to correctly calculate the thrust gradient or the current gradient. The position difference 611 differs with the constitution of the caliper, the gear ratio, the design of the motor and the like, but may be set to, for example, 1 to 2 rotations of the motor.

Here the pad contacting position detection unit 321 includes a pad contact judgment unit 323.

While moving the piston in the pressing direction in the step 605, the pad contacting position is detected in step 606. When the pad contacting position is detected in the step 606, the flow advances to step 608. However, when the pad contacting position is not detected in the step 606, pad contact judgment processing is performed in step 609.

The pad contact judgment processing is processing to judge whether or not the pad has a contact state. The pad contact state is a state in which the pad might come in contact with the rotor. The pad contact judgment can ideally be performed by the same method as the method of detecting the pad contacting position. However, in actual, the detected thrust gradient or current gradient is rippled or undulated owing to the noise of the load detection unit, the torque fluctuations due to the mechanical and electrical constitutions of the caliper and the motor or the like. Therefore, even when the pad contacting position cannot be detected, the piston excessively moves in the pressing direction, and the thrust which considerably influences the vehicle behavior might be generated. Therefore, the pad contact judgment processing is performed so that an excessively large thrust is not absolutely generated even in a case where the pad contacting position cannot be detected.

Figure 19:
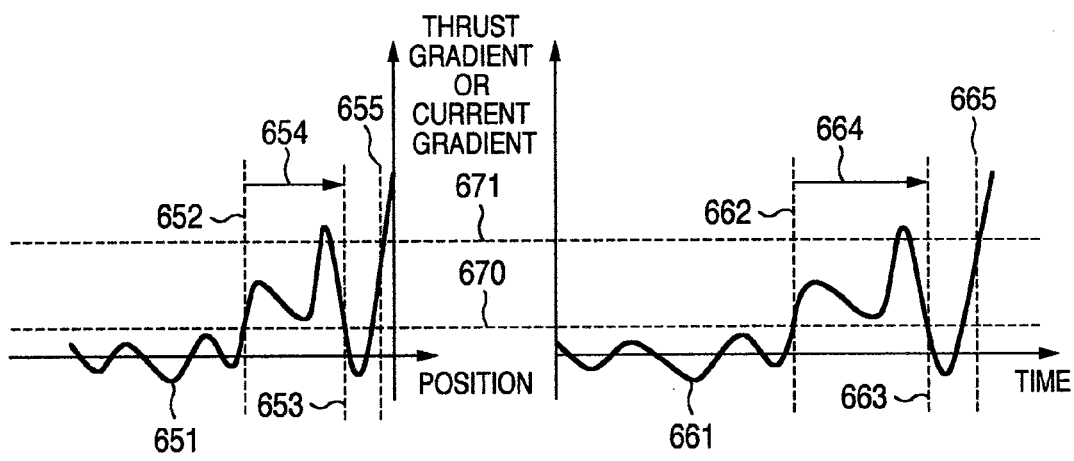
FIG. 19 is a graph showing one example of the pad contacting position detecting method.

The pad contact judgment processing may be performed as shown in, for example, FIG. 19. In FIG. 19, reference numeral 651 is one example of a relationship between the thrust gradient or the current gradient and the position. Reference numeral 661 is one example of a relationship between the thrust gradient or the current gradient and the time. It may be judged that the pad has the contact state, for example, on conditions that the current gradient or the thrust gradient has a threshold value 671 or more or that the piston moves as much as a position difference 654 in the pressing direction while the current gradient or the thrust gradient retains a state of the threshold value 670 or more or that the piston moves in the pressing direction for a time 634 or more while the current gradient or the thrust gradient retains the state of the threshold value 670 or more. Here, in a case where the current gradient or the thrust gradient has the threshold value 670 or more at a position 652 and this state continues for the position difference 654, it may be judged at a position 653 that the pad has the contact state. For example, in a case where the current gradient or the thrust gradient has the threshold value 670 or more at a time 662 and this state continues for a time 664, it may be judged at a time 663 that the pad has the contact state. For example, at a position 655 or a time 665 at which the current gradient or the thrust gradient has the threshold value 671 or more, it may be judged that the pad has the contact state. In a case where it is judged that the pad has the contact state on a plurality of conditions as in the positions 653, 655 and the times 663, 665, it is judged that the pad has the contact state by use of the condition on which it is earliest judged that the pad has the contact state.

In a case where it is judged in the step 607 that the pad has the contact state, although the pad contacting position cannot be detected, it is judged that the pad comes in contact with the rotor to generate the thrust. The flow then returns to the step 602, and the piston is moved again in the detaching direction to perform the pad non-contact judgment. In a case where it is not judged in the step 607 that the pad has the contact state, the flow returns to the step 606 to detect the pad contacting position again.

When the pad contacting position is detected in the step 606, the piston is moved as much as the position difference 612 in the detaching direction in the step 608 to end the pad contacting position detection processing in the step 609. Here, the position difference 612 may correspond to the position difference 538 of FIG. 12, the position difference 558 of FIG. 13 or a predetermined position difference. When the position difference 612 is shorter than the position difference corresponding to the position difference 538 of FIG. 12 or the position difference 558 of FIG. 13, in the step 608, the piston does not move to the pad contacting position, and the pad contacting position detection processing is completed in a state in which the micro thrust is generated. In a case where any braking force or thrust does not have to be generated in this manner and the piston is on standby in a state in which the pad subtly comes in contact with the rotor, an effect of preventing water and dust from entering a gap between the pad and the rotor is obtained. However, when the position difference 612 is shorter than the position difference corresponding to the position difference 538 of FIG. 12 or the position difference 558 of FIG. 13, the state in which the thrust is generated continues. Therefore, since an extra driving torque of the vehicle is required, fuel efficiency is reduced. Therefore, it may be selected whether or not to return the piston to the pad contacting position or whether or not to leave the micro thrust, depending on vehicle characteristics, external environments, a driver as a target and the like.

Moreover, for example, the pad contacting position detection processing may be performed as shown in FIGS. 20A to 20F. FIGS. 20A, 20B and 20C show changes of the thrust, and FIGS. 20D, 20E and 20F show changes of the current. For example, assuming that a position at the start of the pad contacting position detection processing is 701, the position 701 is displaced from the pad contacting position 501 in the pressing direction, a thrust 704 is generated at the start of the pad contacting position detection processing. At the start of the pad contacting position detection processing, since the pad contacting position detection unit 321 moves the piston in the detaching direction as shown by an arrow 703, the thrust quickly decreases to zero. The pad non-contact judgment unit 322 performs the pad non-contact judgment processing while the piston moves in the detaching direction. In FIGS. 20A to 20F, at the start of the pad contacting position detection processing, the thrust 704 is generated. It is not judged that the pad has the non-contact state at least until the piston position is displaced from the pad contacting position 501 in the detaching direction. Furthermore, the pad non-contact state is not obtained until it can be judged that the pad securely comes away from the rotor and that the thrust turns to zero.

Here, assuming that it is judged at a position 702 that the pad has the non-contact state, the pad contacting position detection unit 321 further moves the piston as much as the position difference 611 in the detaching direction to move the piston to a position 712. When the piston moves to the position 712, the pad contacting position detection unit 321 changes the movement direction of the piston to the pressing direction as shown by an arrow 711 to move the piston. Furthermore, the pad contacting position detection unit 321 moves the piston in the pressing direction as shown by an arrow 721 to detect the pad contacting position. In FIG. 20, for example, the pad contacting position may be detected at a position 722 displaced from the pad contacting position as much as a position difference 724 in the pressing direction.

Moreover, for example, the pad contacting position detection processing may be performed as shown in FIGS. 21A to 21F. FIGS. 21A, 21B and 21C show changes of the thrust, and FIGS. 21D, 21E and 21F show changes of the current. For example, assuming that a position at the start of the pad contacting position detection processing is 751, the position 751 is displaced from the pad contacting position 501 in the pressing direction, any thrust is not generated. At the start of the pad contacting position detection processing, while the pad contacting position detection unit 321 moves the piston in the detaching direction as shown by an arrow 753, the pad non-contact judgment unit 322 performs the pad non-contact judgment processing while the piston moves in the detaching direction. In FIGS. 21A to 21F, at the start of the pad contacting position detection processing, the thrust is zero. Therefore, it is instantly judged that the pad has the non-contact state. For example, in FIGS. 21A to 21F, it may be judged at a position 752 that the pad has the non-contact state. After it is judged that the pad has the contact state, the pad contacting position detection unit 321 further moves the piston as much as the position difference 611 in the detaching direction to move the piston to a position 762. When the piston moves to the position 762, the pad contacting position detection unit 321 changes the movement direction of the piston as shown by an arrow 761 to move the piston in the pressing direction. Furthermore, the pad contacting position detection unit 321 moves the piston in the pressing direction as shown by an arrow 771 to detect the pad contacting position. For example, in FIGS. 21A to 21F, it may be assumed that the pad contacting position is detected at a position 772 displaced from the pad contacting position as much as a position difference 774 in the pressing direction.

Figure 22:
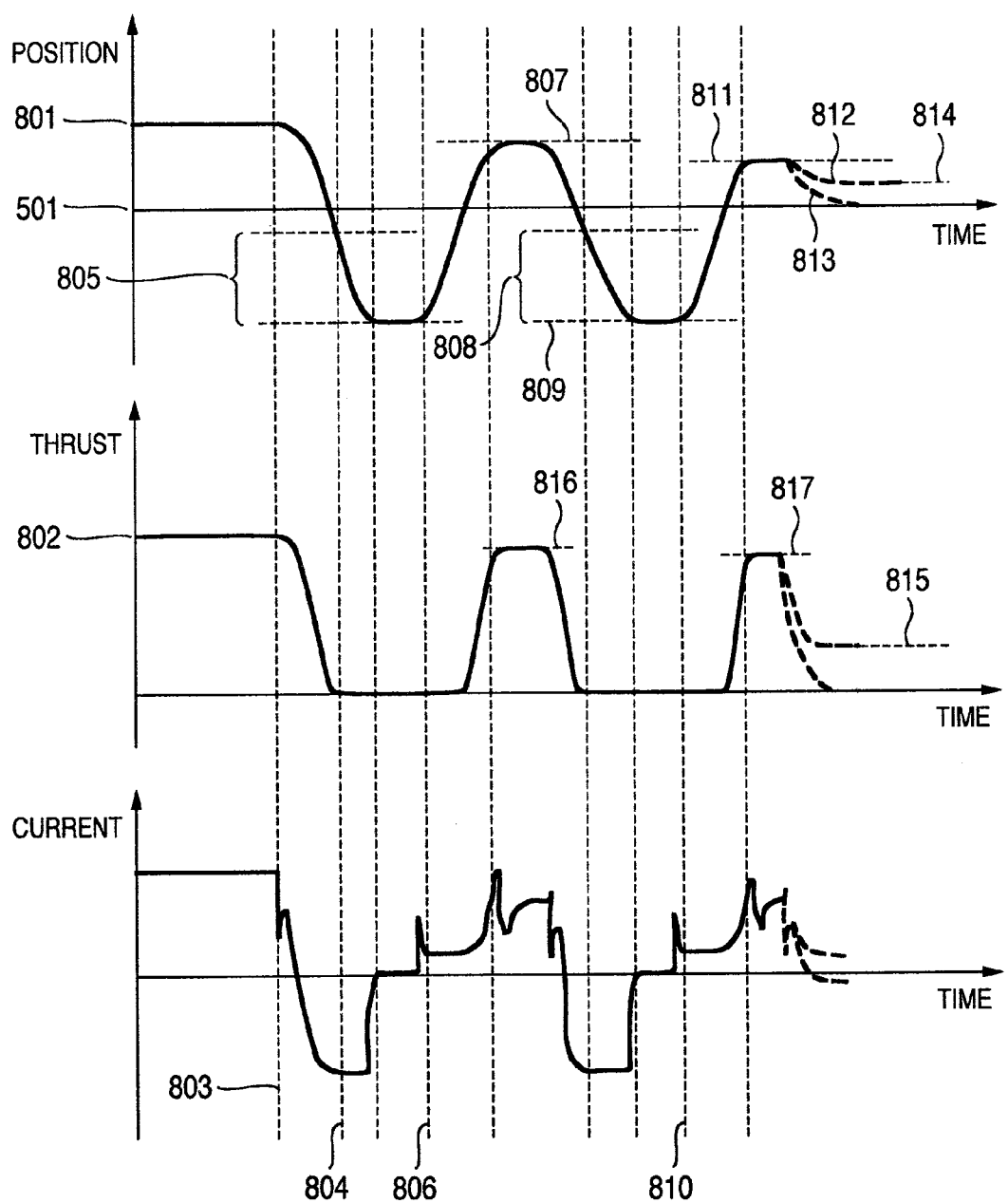
FIG. 22 is a graph showing one example of the pad contacting position detecting method.

Furthermore, for example, the pad contacting position detection processing may be performed as shown in FIG. 22.

FIG. 22 shows changes of the position, the thrust and the current with respect to the time during the pad contacting position detection processing. In FIG. 22, at the start of the pad contacting position detection processing, a position 801 is displaced from the pad contacting position 501 in the pressing direction, and a thrust 802 is generated. For example, assuming that the pad contacting position detection is started at a time 803, first the piston is moved in the detaching direction to perform the pad non-contact judgment processing. For example, in a case where it is judged at a time 804 that the pad has the non-contact state, the piston is further moved as much as a position difference 805 in the detaching direction. Furthermore, from a time 806, the piston is moved in the pressing direction to detect the pad contacting position. In FIG. 22, it is judged at a position 807 that the pad has the contact state before the pad contacting position is detected. From this position, the piston is moved again in the detaching direction. Furthermore, it is judged at a position 808 that the pad has the non-contact state, and the piston is moved to a position 809. In addition, the piston is moved again from a time 810 in the pressing direction, and the pad contacting position is then detected at a position 811. After detecting the pad contacting position, as shown by a broken line 813, the piston is moved to the pad contacting position, or the piston is moved to a position 814 where a slight thrust 815 is left as shown by a broken line 812.

Figure 23:
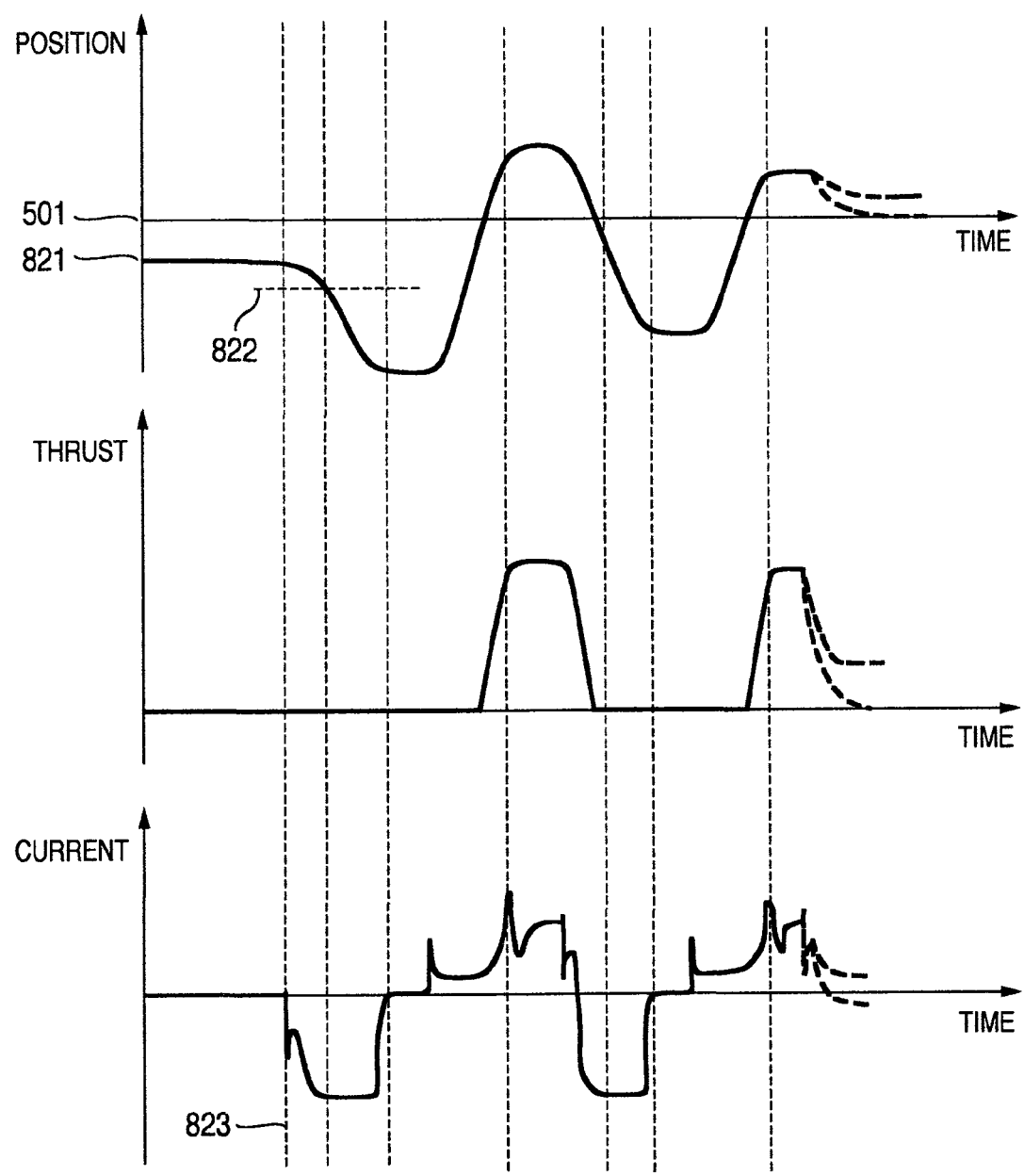
FIG. 23 is a graph showing one example of the pad contacting position detecting method.

In addition, for example, the pad contacting position detection processing may be performed as shown in FIG. 23. FIG. 23 shows changes of the position, the thrust and the current with respect to the time during the pad contacting position detection processing. In FIG. 23, at the start of the pad contacting position detection processing, a position 821 is displaced from the pad contacting position 501 in the pressing direction, and any thrust is not generated. For example, assuming that the pad contacting position detection is started at a time 823, first the piston is moved in the detaching direction to perform the pad non-contact judgment processing. In FIG. 23, since any thrust is not generated at the start of the pad contacting position detection processing, it is judged earlier than FIG. 22, for example, at the time 823 that the pad has the non-contact state. A piston operation after the time 823 is similar to that shown in FIG. 22.

When the piston is moved as shown in FIGS. 20A to 20F, 21A to 21F, 22 and 23, the thrusts 725, 775 or the thrusts 816, 817 generated to detect the pad contacting position can be reduced that the influence of the thrusts on the vehicle behavior can be ignored. Even when the position at the start of the pad contacting position detection processing is displaced from the pad contacting position in the pressing direction to generate the thrust, or even when the position at the start of the pad contacting position detection processing is displaced from the pad contacting position in the detaching direction and any thrust is not generated, the pad contacting position can be detected by the same operation. In actual, the position and the thrust at the start of the pad contact detection are not clarified in many cases. Therefore, the pad contacting position detection unit 321 detects the pad contacting position by operating the piston as shown in FIGS. 17, 20A to 20F, 21A to 21F, 22 and 23.

Figure 24:
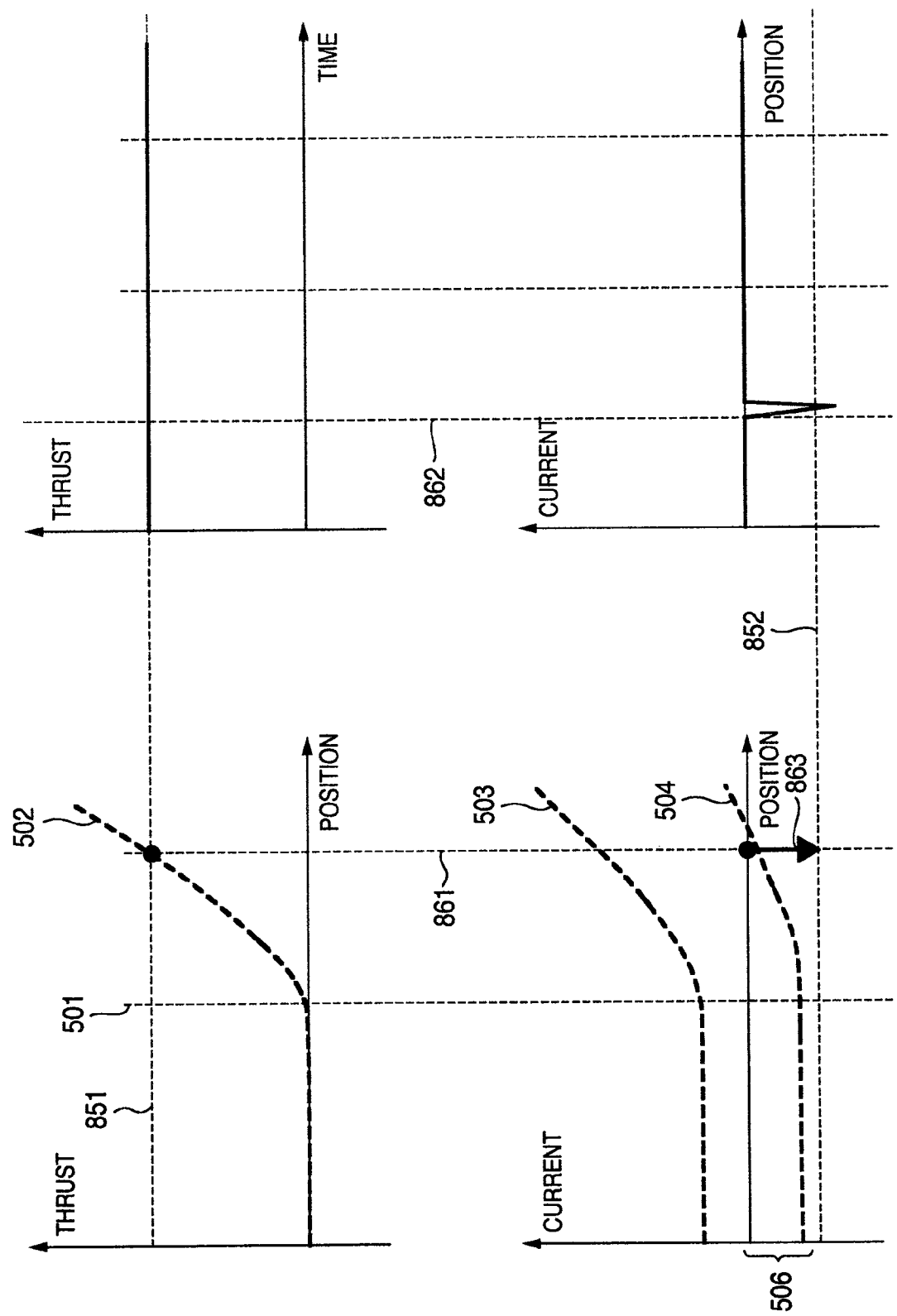
FIG. 24 is a graph showing one example of a PKB state judgment method.

Moreover, for example, when the PKB has an ON-state, detection processing may be performed as shown in FIG. 24. In FIG. 24, at the start of the pad contacting position detection processing, the PKB has the ON-state and a thrust 851 is retained at a position 862. Here, even when the piston is to be moved in the detaching direction, the thrust 851 and a position 861 are retained. Therefore, a current is passed in the negative direction as shown by an arrow 863 owing to feedback processing by the computer 222.

Here, the pad contacting position detection unit 321 includes a PKB state judgment unit 324. When the current has a value below a threshold value 852, the PKB state judgment unit 324 judges that the PKB has an ON-state, and the pad contacting position detection processing is discontinued. Here, the threshold value 852 is set to be sufficiently on a negative side from the threshold value 506. The threshold value 852 is set so that the PKB mechanism does not break owing to the pad reactive force and the motor torque in the negative direction.

The electric braking apparatus transmits information judged by the PKB state judgment unit to the host system. The host system turns on or off a PKB operation lamp based on the information transmitted from the electric braking apparatus. Here, when a PKB state transmitted from the electric braking apparatus is a PKB ON-state, the host system turns on the operation lamp. When there is mismatch between a state of a PKB SW and the PKB state judged by the electric braking apparatus, the host system judges that abnormality has occurred to perform system processing.

In the pad contacting position detection processing, since the piston needs to be moved from the pad contacting position in the detaching direction, the thrust surely turns to zero. Therefore, a timing to perform the pad contacting position detection processing is limited.

Here, the electric caliper control unit 301 includes a pad contacting position detection timing judgment unit 325.

The pad contacting position detection timing judgment unit 325 judges a timing to perform the pad contacting position detection processing in accordance with a driver's pedal operation, a vehicle movement and convenience of the host system.

The pad contacting position detection timing judgment unit 325 performs the pad contacting position detection processing, in a case where it is not judged at the start of the system that the PKB has the ON-state. When the host system instructs PKB release, the PKB is brought into an OFF-state. After the thrust turns to zero, the pad contacting position is detected. At the start of the system, a volatile memory of the computer 222 is initialized. Even when the pad contacting position is stored in the nonvolatile memory, the pad contacting position might change with a pad temperature or the like during interruption of the system. Therefore, pad contacting position detection timing judgment unit 325 acquires the pad contacting position, when the system is started.

Here, during the interruption of the system, the electric caliper ECU 103 cannot drive the electric caliper 102. The start of the system is a state that the electric caliper 102 under the interruption of the system can start the electric caliper 102.

Moreover, when the thrust is generated and then turns to zero or almost zero, the pad contacting position detection timing judgment unit 325 detects the pad contacting position. This is because the pad temperature or the like changes owing to the generation of the thrust and the pad contacting position might change.

Furthermore, the pad contacting position detection timing judgment unit 325 detects the pad contacting position, in a case where a state in which the thrust is zero or almost zero continues for a certain time. This is because the pad temperature or the like changes with an elapse of time and the pad contacting position might change.

In addition, when the host system instructs the pad contacting position detection, the pad contacting position detection timing judgment unit 325 detects the pad contacting position in order that a situation in which the vehicle behavior during the pad contacting position detection is hardly influenced is judged from a state of all of four wheels or the whole vehicle to detect the pad contacting position.

Figure 25:
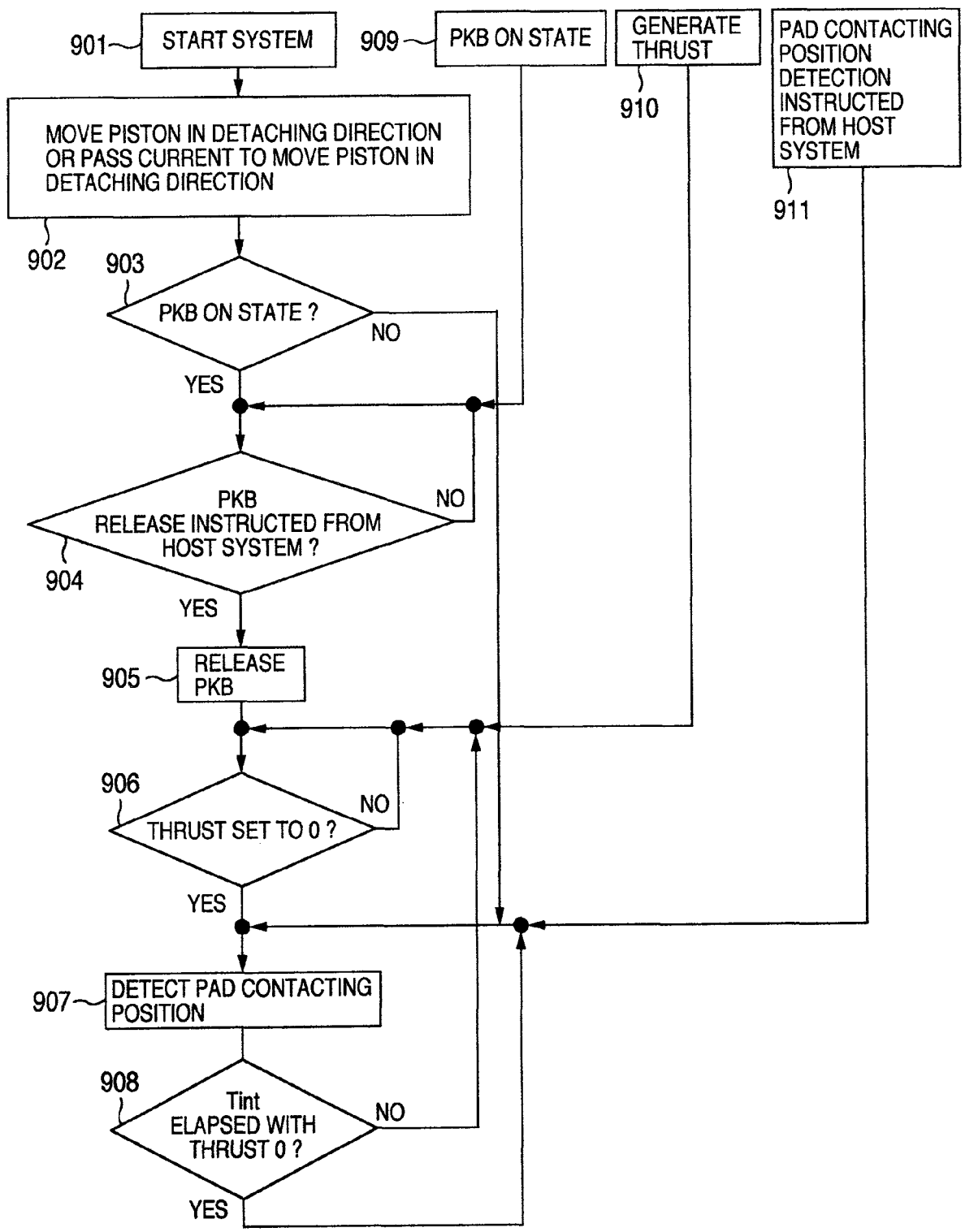
FIG. 25 is a flow chart showing one example of a pad contacting position detecting timing judgment unit.

FIG. 25 is a flow chart of processing to be performed by the pad contacting position detection timing judgment unit 325 and the pad contacting position detection unit 321.

When the system is started in step 901, the pad contacting position detection unit 321 moves the piston in the detaching direction in step 902. The current is passed in the negative direction as the case may be. Subsequently, the PKB state judgment unit 324 judges in step 903 whether or not the PKB has an ON-state. In a case where it is judged in the step 903 that the PKB has the ON-state, it is waited in step 904 until the host system instructs the PKB release. In a case where it is judged in the step 904 that the host system instructs the PKB state, the PKB is released in step 905, and the thrust is set to zero in step 906. In a case where it is judged in the step 906 that the thrust is zero or it is judged in the step 903 that the PKB does not have the ON-state, the pad contacting position detection processing is performed in step 907. In a case where pad contacting position detection processing ends and it is judged in step 908 that the thrust remains to be zero with an elapse of time Tint or more, the flow returns to the step 907 to perform the pad contacting position detection processing. Here, the time Tint is determined in accordance with heat radiation characteristics of the pad. However, since the radiation characteristics include a comparatively large time constant, the time Tint may be long. For example, the time Tint may be set to ten seconds or more.

Here, for example, in a case where any braking force is not generated in the vehicle but the micro thrust is generated and the piston is on standby, in the steps 906, 908, the thrust may be set to a micro thrust so that the piston is on standby.

Furthermore, in a case where it is judged during the start of the system that the PKB has the ON-state, the flow advances from step 909 to the step 904, and the pad contacting position detection processing is performed after the PKB is released.

In addition, when the thrust is generated to brake the vehicle, the flow advances from step 910 to the step 906 to perform the pad contacting position detection processing after the thrust is removed.

Moreover, when the host system 146 instructs the pad contacting position detection, the flow advances from step 911 to the step 907 to perform the pad contacting position detection processing.

When the host system 146 instructs the pad contacting position detection to the pad contacting position detection timing judgment unit 325, the host system 146 instructs the pad contacting position detection so as to minimize an influence of the pad contacting position detection on the vehicle movement. For example, the host system 146 does not instruct the pad contacting position detection to the electric calipers of four wheels simultaneously, and may instruct at separate timings. In a case where the pad contacting position detection is instructed for each electric braking apparatus at the separate timing so that the pad contacting positions are not simultaneously detected at all of the electric calipers, the influence of the pad contacting position detection on the vehicle behavior can be minimized. In a case where it can be judged that the vehicle stops and that any braking force does not have to be generated by the electric braking apparatus, the host system 146 may instruct the pad contacting position detection. When the vehicle stops, the influence of the pad contacting position on the vehicle behavior can be eliminated. Here, as a method of judging that it is not necessary to generate the braking force may be performed on conditions that the brake pedal is not depressed. In a case where it can be judged that the vehicle is running at a sufficiently high speed, the host system may instruct the pad contacting position detection. When the vehicle is running at the sufficiently high speed, the driver can hardly feel the influence of the pad contacting position detection on the vehicle movement. Here, it may be judged that the vehicle is running at the sufficiently high speed, for example, on conditions that the vehicle speed is set to a predetermined threshold value or more. Here, the vehicle speed threshold value as the condition on which it is judged that the vehicle is running at the sufficiently high speed differs with a weight and a size of the vehicle, design of a suspension system and a body, the driver as the target and the like. For example, it may be judged at, for example, 50 km/h or more that the vehicle is running at the sufficiently high speed. For example, the host system may instruct the pad contacting position detection at a timing when the braking force is generated in the vehicle by an apparatus other than the electric braking apparatus mounted on the vehicle. Here, for example, the host system may instruct the pad contacting position detection at a timing when the driver stops acceleration and an engine brake starts operating. When the engine brake starts operating, the braking force is naturally exerted on the vehicle. Therefore, the driver can hardly feel the influence of the micro braking force due to the pad contacting position detection. Here, the timing when the engine brake starts operating may be detected by a timing when the driver releases the accelerator pedal, or based on an accelerator opening signal, the engine speed, an engine torque or the like. For example, the host system may instruct the pad contacting position detection at the timing when the braking force due to regeneration of the driving device is generated. Even during the regeneration, the driver can hardly feel the influence of the micro braking force due to the pad contacting position in the same manner as in the engine brake.

Figure 26:
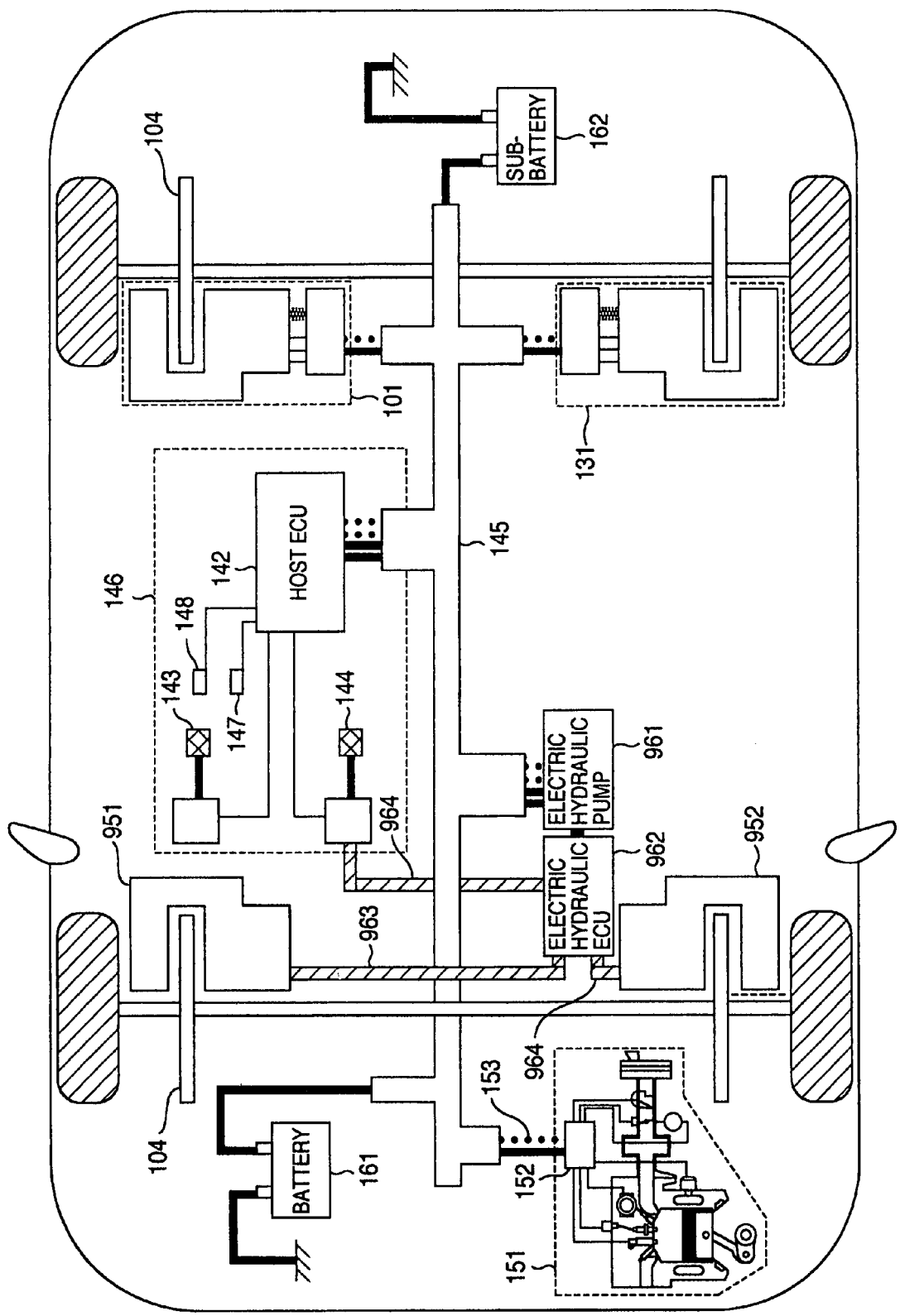
FIG. 26 is a schematic diagram of a system showing one example of a constitution of another embodiment.

FIG. 26 is a schematic diagram of a system according to another embodiment.

In FIG. 26, front wheels include hydraulic calipers 951 and 952. The hydraulic calipers press pads onto rotors owing to hydraulic pressures of hydraulic pipes 963, 964. The hydraulic pressure is generated by an electric hydraulic pump 962, and controlled by an electric hydraulic ECU 961. Even when a brake pedal is connected to the hydraulic pipe 964 and the electric hydraulic pump 962 cannot be driven, the hydraulic pressure is generated only by a depressing force of the brake pedal, and a minimum braking force can be secured. The electric hydraulic ECU 961 may serve as a host ECU 142, and a host system 146 includes the electric hydraulic ECU 961. In such a system, since the front wheels include the hydraulic calipers, any pad contacting position does not have to be detected. However, electric calipers 101, 131 of rear wheels require pad contacting position detection according to the present invention in the same manner as in Embodiment 1.

As described above, in the electric braking apparatus and a vehicle including the apparatus according to the present embodiment, the electric braking apparatus presses the pad onto the rotor by an electric actuator to generate the braking force, includes a pad contacting position detection unit which performs pad contacting position detection processing to detect the pad contacting position, and a piston or the pad moves in a detaching direction at a predetermined specific timing for the pad contacting position detection processing.

Moreover, the electric braking apparatus and the vehicle including the apparatus according to the present embodiment include a pad non-contact judgment unit which detects the pad contacting position or which judges that the pad has a non-contact state in accordance with a current, a pressing force (a thrust) or a gradient of the current or the thrust while the piston or the pad moves in the detaching direction. In the pad contacting position detection processing, a moved position where the piston or the pad moves in the detaching direction is a position displaced from a position where it is judged that the pad has the non-contact state as much as a predetermined clearance amount or more in the detaching direction. In the pad contacting position detection processing, a moved position where the piston or the pad moves in the detaching direction is at least a position displaced from the pad contacting position as much as a predetermined clearance amount or more in the detaching direction.

Furthermore, the electric braking apparatus and the vehicle including the apparatus according to the present embodiment include a pad contact judgment unit which moves the piston or the pad in a pressing direction so that the thrust is larger than zero and is reduced to such an extent that a vehicle movement is not influenced after the piston or pad moves in the detaching direction or which detects the pad contacting position in accordance with the current, the thrust or the gradient of the current or the thrust while the piston or the pad moves in the pressing direction or which judges that the pad has a contact state. In a case where the pad contacting position is judged earlier than the detection of the pad contacting position while the piston or the pad moves in the pressing direction, the piston or the pad is moved again in the detaching direction.

Moreover, in the electric braking apparatus and the vehicle including the apparatus according to the present embodiment, a predetermined specific timing for the pad contacting position detection is a timing when the electric braking apparatus is started; a timing immediately after the thrust is set to zero or such a small value or less that the vehicle movement is not influenced from a state in which the thrust is generated; a timing immediately after a PKB function is released to set the thrust to zero or such a small value or less that the vehicle movement is not influenced; a timing after an elapse of a predetermined time from a state in which the thrust is set to zero or such a small value or less that the vehicle movement is not influenced; a timing after an elapse of a predetermined time from the previous pad contacting position detection in a state in which the thrust is set to zero or such a small value or less that the vehicle movement is not influenced; or a timing when the pad contacting position detection processing is instructed from the host system via an electric signal or a communication signal.

Furthermore, in the electric braking apparatus and the vehicle including the apparatus according to the present embodiment, in a case where the host system instructs the pad contacting position detection processing to a plurality of electric braking apparatuses, the pad contacting position detection processing is instructed so that the electric braking apparatuses perform the pad contacting position detection at separate timings; the pad contacting position detection processing is instructed, when the vehicle stops and the electric braking apparatus does not have to generate any braking force; the pad contacting position detection processing is instructed, when the vehicle is running at a high speed; the pad contacting position detection processing is instructed, when the braking force is generated in the vehicle by an apparatus other than the electric braking apparatus mounted on the vehicle; or the pad contacting position detection processing is instructed, when the depressed accelerator pedal is released.

Moreover, in the electric braking apparatus and the vehicle including the apparatus according to the present embodiment, the piston or the pad moves at a constant speed during the pad contacting position detection.

Furthermore, in the electric braking apparatus and the vehicle including the apparatus according to the present embodiment, after the pad contacting position is detected, the piston or the pad is moved to the pad contacting position or a position displaced from the pad contacting position as much as a predetermined micro position difference in the pressing direction.

In addition, the electric braking apparatus and the vehicle including the apparatus according to the present embodiment include a PKB state judgment unit. The PKB state judgment unit judges that a PKB has an ON-state to discontinue the pad contacting position detection processing, in a case where the piston does not move even when a current having a predetermined value or more is passed in such a direction as to move the piston in the detaching direction. The PKB state judgment unit transmits, to the host system, an electric signal or a communication signal indicating a PKB ON-state or a PKB OFF-state. The host system turns on a lamp in a case where the PKB state judgment unit judges that a PKB state is the PKB ON-state, and turns off the lamp in a case where the unit judges that the PKB state is the PKB OFF-state.

According to the technique of the present embodiment, the pad contacting position can be detected irrespective of a pad contact state at the start of the pad contacting position detection processing. Therefore, in a standby state, a clearance does not have to be opened in the detaching direction, a drop of response during the generation of the thrust can be minimized, and the pad contacting position can correctly be detected, even in a case where the pad thermally expands or contracts in the standby state. According to the technique of the present embodiment, first the piston moves in a pad detaching direction. Therefore, irrespective of a pad worn state, a pad thermal expansion state or a pad contact state, an influence of the pad contacting position detection processing on a vehicle behavior can be minimized. According to the present technique, the pad contacting position detection processing and the PKB function state detection processing can be performed in a series of processing. The present invention is easily applicable even to the electric caliper including the PKB mechanism.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An electric braking apparatus which operates a piston by an electric actuator so that the piston presses a brake pad onto a brake rotor to generate a braking force, the apparatus comprising:

an electric caliper control unit including a pad contacting position detection unit that is configured to move the brake pad to detach the brake pad from the brake rotor at a predetermined timing for a purpose of detecting a contacting position between the brake pad and the brake rotor, and then to move the brake pad, under a predetermined condition, in a direction of pressing the brake rotor with the brake pad, and to detect the contacting position based on a predetermined sensor signal while the brake pad or the piston is moving; and a signal output unit configured to output a control signal to the electric actuator in accordance with processing of the electric caliper control unit;

wherein the pad contacting position detection unit includes a pad non-contact judgment unit that judges a non-contact state between the brake pad and the brake rotor to exist when the brake pad is moved to detach the brake pad from the brake rotor; and wherein the electric caliper control unit sets a moved position of the brake pad moving in the detaching direction, said moved position being a position displaced as much as a predetermined clearance amount in a detaching direction from a position in which the pad non-contact judgment unit judges the non-contact state between the brake pad and the brake rotor to exist.

2. The electric braking apparatus according to claim 1, wherein the contacting position detection unit detects the contacting position based on at least one of a current value of the electric actuator which flows while the brake pad or the piston moves in the detaching direction, a thrust value of the brake pad or the piston, a gradient of the current value, and a gradient of the thrust value.

3. The electric braking apparatus according to claim 1, wherein the electric caliper control unit sets a position displaced as much as a predetermined clearance amount from the contacting position detected by the contacting position detection unit as a moved position of the brake pad.

4. The electric braking apparatus according to claim 1, wherein, after the brake pad moves in a direction of detaching from the brake rotor, the electric caliper control unit moves the brake pad or the piston in such a direction as to press the brake pad or the piston onto the brake rotor until a thrust is set to a predetermined value larger than zero so that a vehicle movement is not influenced.

5. The electric braking apparatus according to claim 4, wherein the contacting position detection unit detects a pad contacting position in accordance with a current, a thrust or a gradient of the current or the thrust while the brake pad or the piston moves in a pressing direction.

6. The electric braking apparatus according to claim 4, further comprising:

a pad contact judgment unit which judges a contact state between the brake pad and the brake rotor, wherein when the pad contact judgment unit judges the contact state before the contacting position detection unit detects the contacting position, the electric caliper control unit moves the brake pad or the piston in the detaching direction.

7. The electric braking apparatus according to claim 1, wherein the electric caliper control unit performs the processing to detach the brake pad from the brake rotor during starting of the electric braking apparatus.

8. The electric braking apparatus according to claim 1, wherein the electric caliper control unit performs the processing to detach the brake pad from the brake rotor, after a thrust is set to zero or such a predetermined value or less that a vehicle movement is not influenced from a state in which the thrust of the piston is generated.

9. The electric braking apparatus according to claim 1, further comprising:

a parking brake mechanism, wherein the electric caliper control unit performs the processing to detach the brake pad from the brake rotor, after the parking brake mechanism is released to set a thrust of the piston to zero or such a predetermined value or less that a vehicle movement is not influenced.

10. The electric braking apparatus according to claim 1, wherein the electric caliper control unit performs the processing to detach the brake pad from the brake rotor, after an elapse of a predetermined time from a state in which a thrust of the piston is set to zero or such a predetermined value or less that a vehicle movement is not influenced.

11. The electric braking apparatus according to claim 1, wherein the electric caliper control unit performs the processing to detach the brake pad from the brake rotor, when a predetermined time elapses from a state in which a thrust is set to zero or such a predetermined value or less that a vehicle movement is not influenced after the previous pad contacting position detection.

12. The electric braking apparatus according to claim 1, wherein the electric caliper control unit performs the processing to detach the brake pad from the brake rotor, when a host control device instructs pad contacting position detection processing with an electric signal or a communication signal.

13. The electric braking apparatus according to claim 1, wherein the electric caliper control unit performs control so that the piston or the brake pad moves at a constant speed, when the electric caliper control unit performs the processing to detach the brake pad from the brake rotor.

14. The electric braking apparatus according to claim 1, wherein after the contacting position detection unit detects a pad contacting position, the electric caliper control unit moves the piston or the brake pad to the pad contacting position or a position displaced from the pad contacting position as much as a predetermined distance in a pressing direction.

15. The electric braking apparatus according to claim 1, further comprising:
a parking brake mechanism; and
a parking brake state judgment unit which judges that a parking brake has an ON-state, when a current having a predetermined value or more is passed through the actuator in such a direction as to move the piston in the detaching direction but the piston does not move,
wherein the contacting position detection unit discontinues pad contacting position detection processing, in a case where the parking brake state judgment unit judges that the parking brake has the ON state.

16. The electric braking apparatus according to claim 15, wherein the parking brake state judgment unit outputs, to a host control device, an electric signal or a communication signal indicating the ON-state or an OFF-state of the parking brake.

17. The electric braking apparatus according to claim 1, wherein the contacting position indicates a position where the piston comes in contact with a parking brake, in a case where the piston and the brake pad come away from each other while the parking brake is brought into contact with the brake rotor.

18. A vehicle comprising:
a plurality of electric braking apparatus each of which operates a piston by an electric actuator so that the piston presses a brake pad onto a brake rotor to generate a braking force, the apparatus comprising:
a host control device which outputs a braking force instruction to the plurality of electric braking apparatus; and
a pad non-contact judgment unit that judges a non-contact state between the brake pad and the brake rotor to exist when the brake pad is moved to detach the brake pad from the brake rotor;
wherein the host control device outputs a pad contacting position detecting instruction to detect a contacting position between the brake pad and the brake rotor;
wherein the electric braking apparatus has an electric caliper control unit including a pad contacting position detection unit that is configured to detach the brake pad from the brake rotor at a time when the pad contacting position detecting instruction is input, and then to move the brake pad, under a predetermined condition, in a direction of pressing the brake rotor with the brake pad, and to detect the contacting position based on a predetermined sensor signal while the brake pad or the piston is moving, and a signal output unit which outputs a control signal to the electric actuator in response to the processing of the electric caliper control unit;
wherein the pad contacting position detection unit includes a pad non-contact judgment unit that judges a non-contact state between the brake pad and the brake rotor to exist when the brake pad is moved to detach the brake pad from the brake rotor; and
wherein the electric caliper control unit sets a moved position of the brake pad moving in the detaching direction, said moved position being a position displaced as much as a predetermined clearance amount in a detaching direction from a position in which the pad non-contact judgment unit judges the non-contact state between the brake pad and the brake rotor to exist.

19. The vehicle according to claim 18, wherein the host control device outputs the pad contacting position detecting instruction so that the plurality of electric braking apparatuses perform the pad contacting position detection at separate timings.

20. The vehicle according to claim 18, wherein the host control device outputs the pad contacting position detecting instruction in a case where the vehicle stops and the electric braking apparatuses do not have to generate any braking force.

21. The vehicle according to claim 18, wherein the host control device outputs the pad contacting position detecting instruction, in a case where the vehicle is running at a speed not lower than a predetermined speed.

22. The vehicle according to claim 18, wherein the host control device outputs the pad contacting position detecting instruction, in a case where the braking force is generated in the vehicle by a device other than the electric braking apparatuses mounted on the vehicle.

23. The vehicle according to claim 18, wherein the host control device outputs the pad contacting position detecting instruction, in a case where a driver releases a depressed accelerator pedal.

24. The vehicle according to claim 18, wherein the electric braking apparatus includes a parking brake mechanism, and a parking brake state judgment unit which judges that a parking brake has an ON-state and outputs, to the host control device, an electric signal or a communication signal indicating the ON-state or an OFF-state of the parking brake, when a current having a predetermined value or more is passed through the actuator in such a direction as to move the piston in the detaching direction but the piston does not move, and
the host control device informs a driver of the ON-state or the OFF-state with a lamp based on the electric signal or the communication signal.

* * * * *